United States Patent
McCauley et al.

(10) Patent No.: US 7,580,953 B2
(45) Date of Patent: *Aug. 25, 2009

(54) SYSTEM AND METHOD FOR SCHEMA LIFECYCLES IN A VIRTUAL CONTENT REPOSITORY THAT INTEGRATES A PLURALITY OF CONTENT REPOSITORIES

(75) Inventors: Rodney McCauley, Loveland, CO (US);
James Owen, Evergreen, CO (US);
Christopher E. Bales, Boulder, CO (US)

(73) Assignee: BEA Systems, Inc., San Jose, CA (US)

(*) Notice: Subject to any disclaimer, the term of this patent is extended or adjusted under 35 U.S.C. 154(b) by 700 days.

This patent is subject to a terminal disclaimer.

(21) Appl. No.: 11/098,781

(22) Filed: Apr. 4, 2005

(65) Prior Publication Data

US 2005/0228807 A1   Oct. 13, 2005

Related U.S. Application Data

(63) Continuation-in-part of application No. 10/911,099, filed on Aug. 4, 2004, now Pat. No. 7,246,138.

(60) Provisional application No. 60/561,796, filed on Apr. 13, 2004.

(51) Int. Cl.
*G06F 17/00* (2006.01)
(52) U.S. Cl. .................... 707/104.1; 707/200
(58) Field of Classification Search .......... 707/104.1, 707/1, 10, 100, 200, 203
See application file for complete search history.

(56) References Cited

U.S. PATENT DOCUMENTS

| 4,853,843 | A | 8/1989 | Ecklund |
| 5,173,939 | A | 12/1992 | Abadi et al. ............... 380/25 |
| 5,237,614 | A | 8/1993 | Weiss |
| 5,335,345 | A | 8/1994 | Frieder et al. |
| 5,347,653 | A | 9/1994 | Flynn et al. |
| 5,355,474 | A | 10/1994 | Thuraisingham et al. |
| 5,369,702 | A | 11/1994 | Shanton |
| 5,426,747 | A | 6/1995 | Weinreb et al. |
| 5,481,700 | A | 1/1996 | Thuraisingham ......... 395/600 |

(Continued)

FOREIGN PATENT DOCUMENTS

EP   1 256 889   11/2002

(Continued)

OTHER PUBLICATIONS

"USDataCenter Chooses Baltimore SelectAccess to Enable Next generation Security Solutions for eBusiness"; Business Wire, P2079, Apr. 4, 2001; Newswire; Trade; pp. 2.

(Continued)

*Primary Examiner*—Uyen T. Le
(74) *Attorney, Agent, or Firm*—Fliesler Meyer LLP

(57) ABSTRACT

A system and method for providing a lifecycle for content in a virtual content repository (VCR), comprising, integrating a plurality of repositories into the VCR, storing the content in the VCR, allowing the content to go through a set of states according to a lifecycle definition, and wherein the content is accessible through a logical namespace that encompasses the plurality of repositories.

27 Claims, 11 Drawing Sheets

U.S. PATENT DOCUMENTS

| | | | |
|---|---|---|---|
| 5,544,322 A | 8/1996 | Cheng et al. | |
| 5,574,898 A | 11/1996 | Leblang et al. | |
| 5,627,886 A | 5/1997 | Bowman | |
| 5,757,669 A | 5/1998 | Christie et al. | |
| 5,797,128 A | 8/1998 | Birnbaum | 707/5 |
| 5,806,066 A | 9/1998 | Golshani et al. | |
| 5,825,883 A | 10/1998 | Archibald et al. | |
| 5,826,000 A | 10/1998 | Hamilton | |
| 5,826,268 A | 10/1998 | Schaefer et al. | 707/9 |
| 5,848,396 A | 12/1998 | Gerace | |
| 5,867,667 A | 2/1999 | Butman et al. | |
| 5,872,928 A | 2/1999 | Lewis et al. | |
| 5,889,953 A | 3/1999 | Thebaut et al. | |
| 5,918,210 A | 6/1999 | Rosenthal et al. | |
| 5,941,947 A | 8/1999 | Brown et al. | |
| 5,950,195 A | 9/1999 | Stockwell et al. | |
| 5,954,798 A | 9/1999 | Shelton et al. | |
| 5,956,400 A | 9/1999 | Chaum et al. | |
| 5,966,707 A | 10/1999 | Van Huben et al. | |
| 5,987,469 A | 11/1999 | Lewis et al. | |
| 5,987,611 A | 11/1999 | Freund | |
| 5,991,877 A | 11/1999 | Luckenbaugh | 713/200 |
| 6,005,571 A | 12/1999 | Pachauri | 345/339 |
| 6,006,194 A | 12/1999 | Merel | |
| 6,029,144 A | 2/2000 | Barrett et al. | |
| 6,029,182 A | 2/2000 | Nehab et al. | |
| 6,029,196 A | 2/2000 | Lenz | |
| 6,054,910 A | 4/2000 | Tada et al. | |
| 6,055,515 A | 4/2000 | Consentino et al. | |
| 6,055,637 A | 4/2000 | Hudson et al. | |
| 6,058,392 A | 5/2000 | Sampson et al. | |
| 6,073,242 A | 6/2000 | Hardy et al. | |
| 6,083,276 A | 7/2000 | Davidson et al. | 717/1 |
| 6,088,679 A | 7/2000 | Barkley | |
| 6,098,173 A | 8/2000 | Elgressy et al. | |
| 6,108,687 A | 8/2000 | Craig | |
| 6,122,647 A | 9/2000 | Horowitz et al. | |
| 6,141,010 A | 10/2000 | Hoyle | |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A | 12/2000 | Austin | |
| 6,158,010 A | 12/2000 | Moriconi et al. | |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,182,226 B1 | 1/2001 | Reid et al. | |
| 6,182,277 B1 | 1/2001 | DeGroot et al. | |
| 6,185,587 B1 | 2/2001 | Bernardo et al. | |
| 6,202,066 B1 | 3/2001 | Barkley et al. | |
| 6,202,157 B1 | 3/2001 | Brownlie et al. | |
| 6,202,207 B1 | 3/2001 | Donohue | |
| 6,209,101 B1 | 3/2001 | Mitchem et al. | |
| 6,216,134 B1 | 4/2001 | Heckerman et al. | |
| 6,216,231 B1 | 4/2001 | Stubblebine | |
| 6,226,745 B1 | 5/2001 | Wiederhold | |
| 6,241,608 B1 | 6/2001 | Torango | |
| 6,243,747 B1 | 6/2001 | Lewis et al. | |
| 6,253,321 B1 | 6/2001 | Nikander et al. | |
| 6,256,741 B1 | 7/2001 | Stubblebine | |
| 6,260,050 B1 | 7/2001 | Yost et al. | |
| 6,269,393 B1 | 7/2001 | Yost et al. | |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,985 B1 | 9/2001 | Horstmann | |
| 6,292,900 B1 | 9/2001 | Ngo et al. | |
| 6,295,607 B1 | 9/2001 | Johnson | |
| 6,301,613 B1 | 10/2001 | Ahlstrom et al. | |
| 6,304,881 B1 | 10/2001 | Halim et al. | |
| 6,308,163 B1 | 10/2001 | Du et al. | |
| 6,317,868 B1 | 11/2001 | Grimm et al. | |
| 6,321,336 B1 | 11/2001 | Applegate et al. | |
| 6,327,594 B1 | 12/2001 | Van Huben et al. | |
| 6,327,618 B1 | 12/2001 | Ahlstrom et al. | |
| 6,327,628 B1 | 12/2001 | Anuff et al. | |
| 6,339,423 B1 | 1/2002 | Sampson et al. | |
| 6,339,826 B2 | 1/2002 | Hayes, Jr. et al. | |
| 6,341,352 B1 | 1/2002 | Child et al. | |
| 6,353,886 B1 | 3/2002 | Howard et al. | |
| 6,360,363 B1 | 3/2002 | Moser et al. | |
| 6,366,915 B1 | 4/2002 | Rubert et al. | |
| 6,377,973 B2 | 4/2002 | Gideon | |
| 6,381,579 B1 | 4/2002 | Gervais et al. | |
| 6,385,627 B1 | 5/2002 | Cragun | |
| 6,393,474 B1 | 5/2002 | Eichert et al. | |
| 6,397,222 B1 | 5/2002 | Zellweger | |
| 6,397,231 B1 | 5/2002 | Salisbury et al. | |
| 6,412,070 B1 | 6/2002 | Van Dyke et al. | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,457,007 B1 | 9/2002 | Kikuchi et al. | |
| 6,460,141 B1 | 10/2002 | Olden | 713/201 |
| 6,466,239 B2 | 10/2002 | Ishikawa | |
| 6,466,932 B1 | 10/2002 | Dennis et al. | |
| 6,473,791 B1 | 10/2002 | Al-Ghosein et al. | |
| 6,477,543 B1 | 11/2002 | Huang et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,505,212 B2 | 1/2003 | Nakano et al. | |
| 6,510,513 B1 | 1/2003 | Danieli | |
| 6,519,647 B1 | 2/2003 | Howard et al. | |
| 6,530,024 B1 | 3/2003 | Proctor | |
| 6,539,375 B2 | 3/2003 | Kawasaki | |
| 6,542,993 B1 | 4/2003 | Erfani | |
| 6,571,247 B1 | 5/2003 | Danno et al. | |
| 6,574,736 B1 | 6/2003 | Andrews | |
| 6,581,054 B1 | 6/2003 | Bogrett | |
| 6,581,071 B1 | 6/2003 | Gustman et al. | |
| 6,584,454 B1 | 6/2003 | Hummel et al. | |
| 6,587,849 B1 | 7/2003 | Mason et al. | |
| 6,587,876 B1 | 7/2003 | Mahon et al. | |
| 6,601,233 B1 | 7/2003 | Underwood | |
| 6,615,218 B2 | 9/2003 | Mandal et al. | |
| 6,618,806 B1 | 9/2003 | Brown et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,684,369 B1 | 1/2004 | Bernardo et al. | |
| 6,697,805 B1 | 2/2004 | Choquier et al. | |
| 6,715,077 B1 | 3/2004 | Vasudevan et al. | |
| 6,721,888 B1 | 4/2004 | Liu et al. | |
| 6,728,713 B1 | 4/2004 | Beach et al. | |
| 6,732,144 B1 | 5/2004 | Kizu et al. | |
| 6,735,586 B2 | 5/2004 | Timmons | 707/3 |
| 6,735,701 B1 | 5/2004 | Jacobson | |
| 6,738,789 B2 | 5/2004 | Multer et al. | |
| 6,751,659 B1 | 6/2004 | Fenger et al. | |
| 6,754,672 B1 | 6/2004 | McLauchlin | |
| 6,757,698 B2 | 6/2004 | McBride et al. | |
| 6,757,822 B1 | 6/2004 | Feiertag et al. | |
| 6,769,095 B1 | 7/2004 | Brassard et al. | |
| 6,769,118 B2 | 7/2004 | Garrison et al. | |
| 6,772,332 B1 | 8/2004 | Boebert et al. | |
| 6,779,002 B1 | 8/2004 | Mwaura | |
| 6,789,202 B1 | 9/2004 | Ko et al. | |
| 6,792,537 B1 | 9/2004 | Liu et al. | |
| 6,832,313 B1 | 12/2004 | Parker | |
| 6,834,284 B2 | 12/2004 | Acker et al. | |
| 6,854,035 B2 | 2/2005 | Dunham et al. | |

| | | |
|---|---|---|
| 6,856,999 B2 | 2/2005 | Flanagin et al. |
| 6,857,012 B2 | 2/2005 | Sim et al. |
| 6,865,549 B1 | 3/2005 | Connor |
| 6,873,988 B2 | 3/2005 | Herrmann et al. |
| 6,880,005 B1 | 4/2005 | Bell et al. |
| 6,889,222 B1 | 5/2005 | Zhao |
| 6,901,403 B1 | 5/2005 | Bata et al. |
| 6,904,454 B2 | 6/2005 | Stickler |
| 6,920,457 B2 | 7/2005 | Pressmar |
| 6,922,695 B2 | 7/2005 | Skufea et al. |
| 6,931,549 B1 | 8/2005 | Ananda |
| 6,934,532 B2 | 8/2005 | Coppinger et al. |
| 6,934,934 B1 | 8/2005 | Osborne, II et al. |
| 6,957,261 B2 | 10/2005 | Lortz |
| 6,961,897 B1 | 11/2005 | Peel et al. |
| 6,965,999 B2 | 11/2005 | Fox et al. |
| 6,970,445 B2 | 11/2005 | O'Neill et al. |
| 6,970,876 B2 | 11/2005 | Hotti et al. |
| 6,978,379 B1 | 12/2005 | Goh et al. |
| 6,985,905 B2 | 1/2006 | Prompt et al. |
| 6,985,915 B2 | 1/2006 | Somalwar et al. |
| 6,988,138 B1 | 1/2006 | Alcorn et al. |
| 7,003,578 B2 | 2/2006 | Kanada et al. |
| 7,020,641 B2 | 3/2006 | Leong et al. |
| 7,035,879 B2 | 4/2006 | Shi et al. |
| 7,035,944 B2 | 4/2006 | Fletcher et al. |
| 7,043,472 B2 | 5/2006 | Aridor et al. |
| 7,047,522 B1 | 5/2006 | Dixon et al. |
| 7,054,910 B1 | 5/2006 | Nordin et al. |
| 7,058,958 B1 | 6/2006 | Shutt et al. |
| 7,062,490 B2 | 6/2006 | Adya et al. |
| 7,062,511 B1 | 6/2006 | Poulsen |
| 7,080,000 B1 | 7/2006 | Cambridge |
| 7,085,755 B2 | 8/2006 | Bluhm et al. |
| 7,089,584 B1 | 8/2006 | Sharma |
| 7,093,200 B2 | 8/2006 | Schreiber et al. |
| 7,093,261 B1 | 8/2006 | Harper et al. |
| 7,093,283 B1 | 8/2006 | Chen et al. |
| 7,124,413 B1 | 10/2006 | Klemm et al. |
| 7,174,563 B1 | 2/2007 | Brownlie et al. |
| 7,185,192 B1 | 2/2007 | Kahn |
| 7,219,140 B2 | 5/2007 | Marl et al. |
| 7,272,625 B1 | 9/2007 | Hannel et al. |
| 2001/0032128 A1 | 10/2001 | Kepecs |
| 2001/0034733 A1 | 10/2001 | Prompt et al. |
| 2001/0034771 A1 | 10/2001 | Hutsch et al. |
| 2001/0039586 A1 | 11/2001 | Primak et al. |
| 2001/0044810 A1 | 11/2001 | Timmons |
| 2001/0047485 A1 | 11/2001 | Brown et al. |
| 2002/0005867 A1 | 1/2002 | Gvily |
| 2002/0019827 A1 | 2/2002 | Shiman et al. |
| 2002/0029296 A1 | 3/2002 | Anuff et al. |
| 2002/0059394 A1 | 5/2002 | Sanders |
| 2002/0062451 A1 | 5/2002 | Scheidt et al. |
| 2002/0067370 A1 | 6/2002 | Forney et al. |
| 2002/0069261 A1 | 6/2002 | Bellare et al. |
| 2002/0087571 A1 | 7/2002 | Stapel et al. |
| 2002/0103818 A1 | 8/2002 | Amberden |
| 2002/0104071 A1 | 8/2002 | Charisius et al. |
| 2002/0107913 A1 | 8/2002 | Rivera et al. |
| 2002/0107920 A1 | 8/2002 | Hotti |
| 2002/0111998 A1 | 8/2002 | Kim |
| 2002/0112171 A1 | 8/2002 | Ginter et al. |
| 2002/0120685 A1 | 8/2002 | Srivastava et al. |
| 2002/0124053 A1 | 9/2002 | Adams et al. |
| 2002/0135617 A1 | 9/2002 | Samid |
| 2002/0143819 A1 | 10/2002 | Han et al. |
| 2002/0147645 A1 | 10/2002 | Alao et al. |
| 2002/0152267 A1 | 10/2002 | Lennon |
| 2002/0152279 A1 | 10/2002 | Sollenberger et al. |
| 2002/0161903 A1 | 10/2002 | Besaw |
| 2002/0169893 A1 | 11/2002 | Chen et al. |
| 2002/0169975 A1 | 11/2002 | Good |
| 2002/0173971 A1 | 11/2002 | Stirpe et al. |
| 2002/0174097 A1 | 11/2002 | Rusch et al. |
| 2002/0178119 A1 | 11/2002 | Griffin et al. |
| 2002/0188869 A1 | 12/2002 | Patrick |
| 2002/0194267 A1 | 12/2002 | Flesner et al. |
| 2003/0014442 A1 | 1/2003 | Shiigi et al. |
| 2003/0032409 A1 | 2/2003 | Hutcheson et al. |
| 2003/0046576 A1 | 3/2003 | High et al. |
| 2003/0065721 A1 | 4/2003 | Roskind |
| 2003/0069874 A1 | 4/2003 | Hertzog et al. |
| 2003/0078959 A1 | 4/2003 | Yeung et al. |
| 2003/0078972 A1 | 4/2003 | Tapissier et al. |
| 2003/0088617 A1 | 5/2003 | Clark et al. |
| 2003/0110448 A1 | 6/2003 | Haut et al. |
| 2003/0115484 A1 | 6/2003 | Moriconi et al. |
| 2003/0120686 A1 | 6/2003 | Kim et al. |
| 2003/0126236 A1 | 7/2003 | Marl et al. |
| 2003/0126464 A1 | 7/2003 | McDaniel et al. |
| 2003/0126558 A1 | 7/2003 | Griffin |
| 2003/0131113 A1 | 7/2003 | Reeves et al. |
| 2003/0135490 A1 | 7/2003 | Barrett et al. |
| 2003/0140308 A1 | 7/2003 | Murthy et al. |
| 2003/0146937 A1 | 8/2003 | Lee |
| 2003/0167315 A1 | 9/2003 | Chowdhry et al. |
| 2003/0167455 A1 | 9/2003 | Iborra et al. |
| 2003/0182308 A1 | 9/2003 | Ernst et al. |
| 2003/0182577 A1 | 9/2003 | Mocek |
| 2003/0187956 A1 | 10/2003 | Belt et al. |
| 2003/0200350 A1 | 10/2003 | Kumar et al. |
| 2003/0204481 A1 | 10/2003 | Lau |
| 2003/0212766 A1 | 11/2003 | Giles et al. |
| 2003/0216938 A1 | 11/2003 | Shour |
| 2003/0220913 A1 | 11/2003 | Doganata et al. |
| 2003/0220963 A1 | 11/2003 | Golovinsky et al. |
| 2003/0229501 A1 | 12/2003 | Copeland et al. |
| 2003/0229623 A1 | 12/2003 | Chang et al. |
| 2004/0003071 A1 | 1/2004 | Mathew et al. |
| 2004/0010719 A1 | 1/2004 | Daenen |
| 2004/0019650 A1 | 1/2004 | Auvenshine |
| 2004/0024812 A1 | 2/2004 | Park et al. |
| 2004/0030744 A1 | 2/2004 | Rubin et al. |
| 2004/0030795 A1 | 2/2004 | Hesmer et al. |
| 2004/0078371 A1 | 4/2004 | Worrall et al. |
| 2004/0093344 A1 | 5/2004 | Berger et al. |
| 2004/0098467 A1 | 5/2004 | Dewey et al. |
| 2004/0098606 A1 | 5/2004 | Tan et al. |
| 2004/0107360 A1 | 6/2004 | Herrmann et al. |
| 2004/0162905 A1 | 8/2004 | Griffin et al. |
| 2004/0162906 A1 | 8/2004 | Griffin et al. |
| 2004/0167867 A1 | 8/2004 | Owen et al. |
| 2004/0167880 A1 | 8/2004 | Smith |
| 2004/0167899 A1 | 8/2004 | Patadia et al. |
| 2004/0205473 A1 | 10/2004 | Fisher et al. |
| 2004/0205557 A1 | 10/2004 | Bahrs et al. |
| 2004/0215650 A1 | 10/2004 | Shaji et al. |
| 2004/0230546 A1 | 11/2004 | Rogers |
| 2004/0236760 A1 | 11/2004 | Arkeketa et al. |
| 2004/0243824 A1 | 12/2004 | Jones |
| 2005/0021502 A1 | 1/2005 | Chen et al. |
| 2005/0021656 A1 | 1/2005 | Callegari |
| 2005/0050184 A1 | 3/2005 | Boden et al. |
| 2005/0060324 A1 | 3/2005 | Johnson et al. |
| 2005/0086206 A1 | 4/2005 | Balasubramanian et al. |
| 2005/0097008 A1 | 5/2005 | Ehring et al. |
| 2005/0114672 A1 | 5/2005 | Duncan et al. |
| 2005/0198617 A1 | 9/2005 | Kim et al. |
| 2005/0256894 A1 | 11/2005 | Talanis et al. |
| 2005/0257267 A1 | 11/2005 | Williams et al. |
| 2006/0059107 A1 | 3/2006 | Elmore et al. |
| 2006/0085412 A1 | 4/2006 | Johnson et al. |
| 2006/0122882 A1 | 6/2006 | Brown et al. |
| 2006/0167858 A1 | 7/2006 | Dennis et al. |

2007/0083484 A1    4/2007    McVeigh et al.

FOREIGN PATENT DOCUMENTS

| WO | WO0038078 | 6/2000 |
|---|---|---|
| WO | WO0114962 | 3/2001 |
| WO | WO 01/67285 | 9/2001 |

OTHER PUBLICATIONS

Tanyi, Emmanuel, Easy XML, Mar. 6, 2000, www.winsite.com, pp. 1-6.
Method and System for Visually Constructing Document Type Definitions and Related Artifacts Using a Reusable Object Model, IBM Technical Disclosure Bulleting, copyright IP.com, Inc., May 23, 2001, 3 pages.
Rossi, Gustavo et al., Designing Personalized Web Applications, ACM, WWW10, Hong Kong, May 1-5, 2001, pp. 275-284.
Sundsted, Todd, "JNDI Overview, Part 1: An Introduction to Naming Services," JavaWorld, Jan. 2000, pp. 1-6 (downloaded from: www.javaworld.com/javaworld/jw-01-2000/jw-01-howto_p.html).
Moore, Bill et al., "Migrating Weblogic Applications to WebSphere Advanced Edition," IBM Redbooks, Jan. 2001, pp. 1, 3-4, 109-111 and 181-195.
Barrett, Alexandra, "Trying Out Transactions," SunExpert Magazine, Jan. 1999, pp. 57-59.
Ayers, Danny et al., Professional Java Server Programming, Wrox Press, Ltd., Birmingham, UK, Dec. 1999, pp. 515-545.
Ford, Nigel, Web Developer.com Guide to Building Intelligent Web Sites with JavaScript, Wiley Computer Publishing, NY, NY, copyright 1998, pp. 65-86, 96-98, 101-102, 245-250 and 324-327.
Microsoft Computer Dictionary, 4th Edition, Microsoft Press, Redmond, WA, copyright 1999, p. 489.
Okamoto, Eiji, "Proposal for Integrated Security Systems," Jun. 1992, IEEE Computer Society Press, pp. 354-358.
http://java.sun.com/products/ejb/(last visit: Dec. 7, 2004).
http://www.javaworld.com/jw-12-2002/jw-1207-yesnoejb_p.html (last visit: Dec. 7, 2004).
Browne et al., Technologies for Repository Interoperation and Access Control, ACM 1995, pp. 40-48.
Hayton, R.J. et al., "Access Control in an Open Distributed Environment," 1998 Proceedings of the IEEE Symposium on Security & Privacy, May 3-6, 1998, Oakland, California, USA, 12 pages.
Bertino, Elisa et al., "TRBAC: A Temporal Role-Based Access Control Model," ACM Transactions on Information and System Security (TISSEC), vol. 4, Issue 3 (Aug. 2001), pp. 191-223.
Sandhu, Ravi S. et al., "Role-Based Access Control Models," IEEE Computer, vol. 29, No. 2, Feb. 1996, pp. 38-47.
Covington, Michael J. et al., "Securing Context-Aware Applications Using Environment Roles," ACM Workshop on Role Based Access Control, Proceedings of the Sixth ACM Symposium on Access Control Models and Technologies, SACMAT '01, May 3-4, 2001, Chantilly, Virginia, USA, pp. 10-20.
Yao, Walt et al., "A Model of OASIS Role-Based Access Control and Its Support for Active Security," ACM Workshop on Role Based Access Control, Proceedings of the Sixth ACM Symposium on Access Control Models and Technologies, SACMAT '01, May 3-4, 2001, Chantilly, Virginia, USA, pp. 171-181.
Georgiadis, Christos K. et al., "Flexible Team-Based Access Control Using Contexts," ACM Workshop on Role Based Access Control, Proceedings of the Sixth ACM Symposium on Access Control Models and Technologies, SACMAT '01, May 3-4, 2001, Chantilly, Virginia, USA, pp. 21-27.
Tzelepi, Sofia K. et al., "A Flexible Content and Context-Based Access Control Model for Multimedia Medical Image Database Systems," International Multimedia Conference, Proceedings of the 2001 ACM Workshop on Multimedia and Security: New Challenges, Oct. 5, 2001, pp. 52-55.

Goh, Chen et al., "Towards a More Complete Model of Role," Symposium on Access Control Models and Technologies, Proceedings of the Third ACM Workshop on Role-Based Access Control, 1998, Fairfax, Virginia, USA, pp. 55-61.
http://portal.acm.org/citation.cfm?id=1011436, p. 1, last visited: Oct. 24, 2007.
Koved et al., "Security Challenges for Enterprise Java in an e-Business Environment," pp. 130-152, IBM Systems Journal, vol. 40, No. 1, Jan. 2001.
Microsoft Windows ("Windows Explorer") copyright 1981-2001, 3 pages.
Lee et al., Keeping Virtual Information Resources Up and Running, Nov. 1997, IBM Press, pp. 1-14.
Parker, Elisabeth, The Complete Idiot's Guide to Microsoft FrontPage 2000, 1999, QUE, pp. 7 and 52.
Adomavicius, Gediminas, et al., "User Profiling in Personalization Applications Through Rule Discovery and Validation", KDD '99, San Diego, CA, © ACM 1999, pp. 377-381.
Adya, Atul, et al., "FARSITE: Federated, Available and Reliable Storage for Incompletely Trusted Environment", ACM SIGOPS Operating Systems Review, vol. 36, Issue SI, OSDI '02: Proceedings of the 5th Symposium on Operating Systems Design and Implementation, pp. 1-14 (Winter 2002).
Atkins, D.L., et al., "Mawl: A Domain-Specific Language for Form-Based Services", IEEE Transactions on Software Engineering, IEEE Service Center, Los Alamitos, CA, US, vol. 25, No. 3, pp. 334-346 (May 1999).
Brown, Shirley, et al., "Location-Independent Naming for Virtual Distributed Software Repositories", http://portal.acm.org/dl.cfm, ACM Symposium on Software Reusability, Seattle, WA, US, Aug. 1995, vol. 20, Issue SI, pp. 179-185.
Candan, K.S., et al., "Enabling Dynamic Content Caching for Database-Driven Web Sites", Proceedings of the 2001 ACM SIGMOD International Conference on Management of Data, Santa Barbara, California, USA, May 21-24, 2001, pp. 532-543.
Catley, Christina, et al., "Design of a Health Care Architecture for Medical Data Interoperability and Application Integration", Proceedings of the Second Joint EMBS/BMES Conference, Houston, TX, US, Oct. 23-26, 2002, IEEE, vol. 3, pp. 1952-1953.
Cingil, Ibrahim, et al., "A Broader Approach to Personalization", Communications of the ACM, vol. 43, No. 6, pp. 136-141 (Aug. 2000).
Freudenthal, Eric, et al. "dRBAC: Distributed Role-Based Access Control for Dynamic Coalition Environments", Proceedings of the 22nd International Conference on Distributed Computing Systems (ICDCS '02) IEEE 2002, 10 pages.
Howes, T., "The String Representation of LDAP Search Filters", RFC 2254, Standards Track, ftp://ftp.rfc-editor.org/in-notes/rfc2254.txt, © The Internet Society, 8 pages (Dec. 1997).
Kistler, T., et al., "WebL—a programming language for the Web", Computer Networks and ISDN Systems, North Holland Publishing, Amsterdam, NL, vol. 30, No. 1-7, pp. 259-270 (Apr. 1998).
Levy, M.R., "Web Programming in Guide", Software Practice & Experience, Wiley & Sons, Bognor Regis, GB, vol. 28, No. 15, pp. 1581-1603 (Dec. 25, 1998).
Stephanidis, Constantine, et al., "Decision Making in Intelligent User Interfaces", IUI '97, Orlando, FL, © ACM 1997, pp. 195-202.
Stiemerling, Oliver, et al., "How to Make Software Softer—Designing Tailorable Applications", DIS '97, Amsterdam, The Netherlands, © ACM 1997, pp. 365-376.
Symborski, Carl W., "Updating Software and Configuration Data in a Distributed Communications Network"; IEEE Computer Networking Symposium, Proceedings of the IEEE Computer Society, Washington, D.C., Apr. 11-13, 1988, pp. 331-338.
Zhang, Zheng, et al., "Designing a Robust Namespace for Distributed File Services", IEEE Proceedings of the 20th Symposium on Reliable Distributed Systems, New Orleans, Louisiana, Oct. 28-31, 2001, pp. 162-171.

◇ VCR (400)
- *Neptune (402)*
  - Press Releases (404)
    - 🔒 Japan Account (406)
  - Old Schemas (408)
    - Account Schema (410)
- *Pluto (412)*
  - Internal Memo Schema (414)
  - 2003 Memos (416)
  - 2004 Memos (418)
    - Marketing (Region 1) (420)
    - Clients (422)
    - 🔒 Client Intake Protocol (424)
- *Public (426)*
  - Press Release (428)
  - Translated PR (430)
  - Internal Memos (432)
    - 🔒 Staff Change (434)
- My Workspace (436)
  - *Letter to John (438)*
  - *My client reminder schema (440)*
  - *Assigned Items (442)*
    - Japan Account (444)
    - Internal Memo Schema (446)

*Figure 4*

SYSTEM AND METHOD FOR SCHEMA LIFECYCLES IN A VIRTUAL CONTENT REPOSITORY THAT INTEGRATES A PLURALITY OF CONTENT REPOSITORIES

CLAIM OF PRIORITY

This application claims priority from the following applications, which is hereby incorporated by reference in its entirety:

This application is a Continuation in Part of "SYSTEM AND METHOD FOR CONTENT LIFECYLES"; U.S. patent application Ser. No. 10/911,099; Inventors: Rodney McCauley et al., filed on Aug. 4, 2004; and "SYSTEM AND METHOD FOR CONTENT LIFECYCLES"; U.S. Provisional Application No. 60/561,796, Inventors: Rodney McCauley et al., filed on Apr. 13, 2004.

CROSS-REFERENCE TO RELATED APPLICATIONS

This application is related to the following co-pending applications which are each hereby incorporated by reference in their entirety:

SYSTEM AND METHOD FOR DELEGATED ADMINISTRATION, U.S. patent application Ser. No. 10/279,543, Filed on Oct. 24, 2002, Inventors: Philip B. Griffin, et al., SYSTEM AND METHOD FOR RULE-BASED ENTITLEMENTS, U.S. patent application Ser. No. 10/279,564, Filed on Oct. 24, 2002, Inventors: Philip B. Griffin, et al., SYSTEM AND METHOD FOR HIERARCHICAL ROLE-BASED ENTITLEMENTS, U.S. patent application Ser. No. 10/367,177, filed on Feb. 14, 2003, Inventors: Philip B. Griffin, et al., METHOD FOR ROLE AND RESOURCE POLICY MANAGEMENT, U.S. patent application Ser. No. 10/367,462 filed on Feb. 14, 2003, Inventors: Philip B. Griffin, et al., METHOD FOR ROLE AND RESOURCE POLICY MANAGEMENT OPTIMIZATION, U.S. patent application Ser. No. 10/366,778, filed on Feb. 14, 2003, Inventors: Philip B. Griffin, et al., METHOD FOR DELEGATED ADMINISTRATION, U.S. patent application Ser. No. 10/367,190, filed on Feb. 14, 2003, Inventors: Philip B. Griffin, et al.

SYSTEM AND METHOD FOR CONTENT VERSIONING, U.S. patent application Ser. No. 60/561,780, filed on Apr. 13, 2004, Inventors: Rodney Mc Cauley, et al., SYSTEM AND METHOD FOR CONTENT AND SCHEMA VERSIONING, U.S. patent application Ser. No. 60/561,783, filed on Apr. 13, 2004, Inventors: Rodney McCauley, et al., SYSTEM AND METHOD FOR CONTENT AND SCHEMA LIFECYCLEs, U.S. patent application Ser. No. 60/561,785, filed on Apr. 13, 2004, Inventors: Rodney McCauley, et al., METHODS FOR DELEGATED ADMINISTRATION, U.S. patent application Ser. No. 10/819,043, filed on Apr. 6, 2004, Inventors: Manish Devgan, et al., SYSTEM AND METHOD FOR VIRTUAL CONTENT REPOSITORY DEPLOYMENT, U.S. patent application Ser. No. 60/561,819, filed on Apr. 13, 2004, Inventors: Rodney McCauley, et al., SYSTEM AND METHOD FOR VIRTUAL CONTENT REPOSITORY ENTITLEMENTS, U.S. patent application Ser. No. 60/561,778, filed on Apr. 13, 2004, Inventors: Rodney McCauley, et al., SYSTEM AND METHOD FOR CONTENT TYPE MANAGEMENT, U.S. patent application Ser. No. 60/561,648, filed on Apr. 13, 2004, Inventors: Rodney McCauley, et al., SYSTEM AND METHOD FOR CUSTOM CONTENT LIFECYLES, U.S. patent application Ser. No. 60/561,782, filed on Apr. 13, 2004, Inventors: Rodney McCauley, et al., SYSTEM AND METHOD FOR CONTENT TYPE VERSIONS, U.S. patent application Ser. No. 60/561,759, filed on Apr. 13, 2004, Inventors: Rodney McCauley, et al., SYSTEM AND METHOD FOR INFORMATION LIFECYCLE WORKFLOW INTEGRATION, U.S. patent application Ser. No. 60/561,646, filed on Apr. 13, 2004, Inventors: Rodney McCauley, et al., SYSTEM AND METHOD FOR BATCH OPERATIONS IN A VIRTUAL CONTENT REPOSITORY, U.S. patent application Ser. No. 60/561,799, filed on Apr. 13, 2004, Inventors: Rodney McCauley, et al., SYSTEM AND METHOD FOR VIEWING A VIRTUAL CONTENT REPOSITORY, U.S. patent application Ser. No. 60/561,647, filed on Apr. 13, 2004, Inventors: Rodney McCauley, et al., SYSTEM AND METHOD FOR SEARCHING A VIRTUAL CONTENT REPOSITORY, U.S. patent application No. 60/561,818, filed on Apr. 13, 2004, Inventors: Rodney McCauley, et al., FEDERATED MANAGEMENT OF CONTENT REPOSITORIES, U.S. patent application Ser. No. 10/618,513, filed on Jul. 11, 2003, Inventors: James Owen, et al., VIRTUAL REPOSITORY CONTENT MODEL, U.S. patent application Ser. No. 10/618,519, filed on Jul. 11, 2003, Inventors: James Owen, et al., VIRTUAL CONTENT REPOSITORY BROWSER, U.S. patent application Ser. No. 10/618,379, filed on Jul. 11, 2003, Inventors: Jalpesh Patadia, et al., SYSTEM AND METHOD FOR A VIRTUAL CONTENT REPOSITORY, U.S. patent application Ser. No. 10/618,495, filed on Jul. 11, 2003, Inventors: James Owen, et al., VIRTUAL REPOSITORY COMPLEX CONTENT MODEL, U.S. patent application Ser. No. 10/618,380, filed on Jul. 11, 2003, Inventors: James Owen, et al., SYSTEM AND METHOD FOR SEARCHING A VIRTUAL REPOSITORY CONTENT, U.S. patent application Ser. No. 10/619,165, filed on Jul. 11, 2003, Inventor: Gregory Smith, VIRTUAL CONTENT REPOSITORY APPLICATION PROGRAM INTERFACE, U.S. patent application Ser. No. 10/618,494, filed on Jul. 11, 2003, Inventors: James Owen, et al., SYSTEMS AND METHODS FOR PORTAL AND WEB SERVER ADMINISTRATION, U.S. patent application Ser. No. 10/786,742, Inventors: Christopher Bales, et al., filed on Feb. 25, 2004.

FIELD OF THE DISCLOSURE

The present invention disclosure relates to content management, and in particular, versioning content and providing definable content lifecycles.

BACKGROUND

Content repositories manage and provide access to large data stores such as a newspaper archives, advertisements, inventories, image collections, etc. A content repository can be a key component of a web application such as a portal, which must quickly serve up different types of content in response to user interaction. However, difficulties can arise when trying to integrate more than one vendor's content repository. Each may have its own proprietary application program interface and content services (e.g., conventions for searching and manipulating content, versioning, lifecycles, and data formats). Furthermore, each time a repository is added to an application, the application software must be modified to accommodate these differences. What is needed is a coherent system and method for interacting with disparate repositories and for providing a uniform set of content services across all repositories, including those that lack such services.

BRIEF DESCRIPTION OF THE DRAWINGS

FIG. 4 is an exemplary user interface in various embodiments of the invention.

DETAILED DESCRIPTION

Aspects of the invention are illustrated by way of example and not by way of limitation in the figures of the accompanying drawings in which like references indicate similar elements. It should be noted that references to "an", "one" and "various" embodiments in this disclosure are not necessarily to the same embodiment, and such references mean at least one. If the following description, numerous specific details are set forth to provide a thorough description of the invention. However, it will be apparent to one skilled in the art that the invention may be practiced without these specific details. In other instances, well-known features have not been described in detail so as not to obscure the invention.

Figure 1:
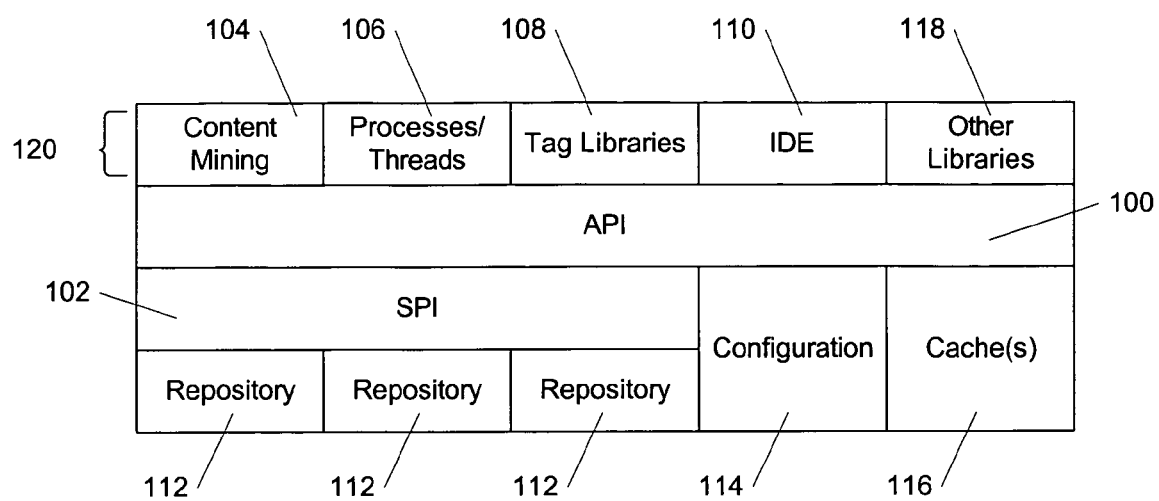
FIG. 1 is an exemplary illustration of functional system layers in various embodiments of the invention.

FIG. 1 is an exemplary illustration of functional system layers in various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A content repository 112 represents a searchable data store. Such systems can relate structured content and unstructured content (e.g., digitally scanned paper documents, Extensible Markup Language, Portable Document Format, Hypertext Markup Language, electronic mail, images, video and audio streams, raw binary data, etc.) into a searchable corpus. Content repositories can be coupled to or integrated with content management systems. Content management systems can provide for content life cycle management, versioning, content review and approval, automatic content classification, event-driven content processing, process tracking and content delivery to other systems. By way of illustration, if a user fills out a loan application on a web portal, the portal can forward the application to a content repository which, in turn, can contact a bank system, receive notification of loan approval, update the loan application in the repository and notify the user by rendering the approval information in a format appropriate for the web portal.

A virtual or federated content repository (hereinafter referred to as "VCR") is a logical representation of one or more individual content repositories such that they appear and behave as a single content repository from the standpoint of application layer 120. The VCR can also add content services to repositories that natively lack them. In various embodiments and by way of illustration, this can be accomplished in part by use of an API (application program interface) 100 and an SPI (service provider interface) 102. An API describes how entities in the application layer can interface with some program logic or functionality. The application layer can include applications (and subdivisions thereof) that utilize the API, such as processes, threads, servlets, portlets, objects, libraries, and other suitable application components. An SPI describes how a service provider (e.g., a content repository, a content management system) can be integrated into a system of some kind. The SPI isolates direct interaction with repositories from the API. In various embodiments, this can be accomplished at run-time wherein the API library dynamically links to or loads the SPI library. In another embodiment, the SPI can be part of a server process such that the API and the SPI can communicate over a network. The SPI can communicate with the repositories using any number of means including, but not limited to, shared memory, remote procedure calls and/or via one or more intermediate server processes.

API's and SPI's can be specified as a collection of classes/interfaces, data structures and/or methods/functions that work together to provide a programmatic means through which VCR service(s) can be accessed and utilized. By way of illustration, APIs and SPIs can be specified in an object-oriented programming language, such as Java™ (available from Sun Microsystems, Inc. of Mountain View, Calif.) and C# (available from Microsoft Corp. of Redmond, Wash.). The API and SPI can be exposed in a number of ways, including but not limited to static libraries, dynamic link libraries, distributed objects, servers, class/interface instances, and other suitable means.

In various embodiments, the API presents a unified view of all repositories to the application layer such that navigation, CRUD operations (create, read, update, delete), versioning, lifecycles, and searching operations initiated from the application layer operate on the repositories as though they were one. Repositories that implement the SPI can "plug into" the VCR. The SPI includes a set of interfaces and services that support API functionality at the repository level. The API and SPI share a content model that represents the combined content of all repositories as a hierarchical namespace of nodes. Given a node N, nodes that are hierarchically inferior to N are referred to as children of N, whereas nodes that are hierarchically superior to N are referred to as parents of N. The topmost level of the hierarchy is termed the federated root. There is no limit to the depth of the hierarchy. In various embodiments, repositories are children of the federated root. Each repository can itself have children.

By way of illustration, content mining facilities 104, processes/threads 106, tag libraries 108, integrated development environments (IDEs) 110, and other libraries 118 can all utilize the API to interact with a VCR. An IDE can provide the ability for a user to interactively build lifecycles and/or content views. Content mining facilities can include services for automatically extracting content from the VCR based on parameters. Java ServerPages™ tag libraries enable portals to interact with the VCR and surface its content on web pages. (Java ServerPages™ is available from Sun Microsystems, Inc.) In addition, it will be apparent to those of skill in the art that many other types of applications and software components utilize the API and are, as such, fully within the scope and spirit of the present disclosure.

In various embodiments, the API can include optimizations to improve the performance of interacting with the VCR. One or more caches 116 can be used to buffer search results and/or recently accessed nodes. In various embodiments, a cache can include a node cache and/or a binary cache. A node cache can be used to provide fast access to recently accessed nodes whereas a binary cache can be used to provide fast access to the content/data associated with each node in a node cache. The API can also provide a configuration facility 114 to enable applications, tools and libraries to configure caches and the VCR. In various embodiments, this facility can be implemented as a Java Management Extension (available from Sun Microsystems, Inc.).

In various embodiments, a model for representing hierarchy information, content and data types is shared between the API and the SPI. In this model, a node can represent hierarchy information, content or a schema information. Hierarchy nodes can serve as a containers for other nodes in the namespace akin to a file subdirectory in a hierarchical file system. Schema nodes represent predefined data types. Content nodes represent content/data. Nodes can have a shape defined by their properties. A property associates a name, a data type and an optional a value which is appropriate for the type. In certain of these embodiments, the properties of content nodes contain values. By way of an illustration, a type can be any of the types described in Table 1. Those of skill in the art will appreciate that many more types are possible and fully within the scope and spirit of the present disclosure.

TABLE 1

Exemplary Property Types in Various Embodiments

| PROPERTY TYPE | DESCRIPTION |
| --- | --- |
| Basic | Text, a number, a date/time, a Boolean value, a choice, an image, a sound, a bit mask, an audio/visual presentation, binary data. |
| Schema | The property is defined based on a schema node. |
| Link | A pointer/reference to data that lives "outside" of a node. |
| Lookup | An expression to be evaluated for locating another node in the VCR |
| Database Mapped | Maps to an existing database table or view. |

In various embodiments, a property can also indicate whether it is required, whether it is read-only, whether it provides a default value, and whether it specifies a property choice. A property choice indicates if a property is a single unrestricted value, a single restricted value, a multiple unrestricted value, or a multiple restricted value. Properties that are single have only one value whereas properties that are multiple can have more than one value. If a property is restricted, its value(s) are chosen from a finite set of values. But if a property is unrestricted, any value(s) can be provided for it. A property can also be designated as a primary property. By way of illustration, the primary property of a node can be considered its default content. For example, if a node contained a binary property to hold an image, it could also contain a second binary property to represent a thumbnail view of the image. If the thumbnail view was the primary property, software applications such as browser could display it by default.

A named collection of one or more property types is a schema. A schema node is a place holder for a schema. In various embodiments, schemas can be used to specify a node's properties. By way of illustration, a Person schema with three properties (Name, Address and DateofBirth) can be described for purposes of discussion as follows:

```
Schema Person = {
    <Name=Name, Type=Text>,
    <Name=Address, Type=Address>,
    <Name=DateofBirth, Type=Date>}
```

Various embodiments allow a node to be defined based on a schema. By way of illustration, a content node John can be given the same properties as the schema Person:

Content Node John is a Person

In this case, the node John would have the following properties: Name, Address and DateofBirth. Alternatively, a node can use one or more schemas to define individual properties. This is sometimes referred to as nested types. In the following illustration, John is defined having an Info property that itself contains the properties Name, Address and DateofBirth. In addition, John also has a CustomerId property:

```
Content Node John = {
    <Name=Info, Type=Person>,
    <Name=CustomerId, Type=Number> }
```

Schemas can be defined logically in the VCR and/or in the individual repositories that form the VCR. In certain embodiments, schemas can inherit properties from at least one other schema. Schema inheritance can be unlimited in depth. That is, schema A can inherit from schema B, which itself can inherit from schema C, and so on. If several schemas contain repetitive properties, a "base" schema can be configured from which the other schemas can inherit. For example, a Person schema containing the properties Name, Address and DateofBirth, can be inherited by an Employee schema which adds its own properties (i.e., Employee ID, Date of Hire and Salary):

```
Schema Employee inherits from Person = {
    <Name=EmployeeID, Type= Number>,
    <Name=DateofHire, Type=Date>,
    <Name=Salary, Type= Number> }
```

Thus, as defined above the Employee schema has the following properties: Name, Address, DateofBirth, EmployeeID, DateofHire and Salary. If the Person schema had itself inherited properties from another schema, those properties would also belong to Employee.

In various embodiments, nodes have names/identifiers and can be specified programmatically or addressed using a path that designates the node's location in a VCR namespace. By way of illustration, the path can specify a path from the federated root ('/') to the node in question ('c'):

/a/b/c

In this example, the opening '/' represents the federated root, 'a' represents a repository beneath the federated root, 'b' is a hierarchy node within the 'a' repository, and 'c' is the node in question. The path can also identify a property ("property1") on a node:

/a/b/c.property1

In aspects of these embodiments, the path components occurring prior to the node name can be omitted if the system can deduce the location of the node based on context information.

In various embodiments, a schema defined in one repository or the VCR can inherit from one or more schemas defined in the same repository, a different repository or the VCR. In certain aspects of these embodiments, if one or more of the repositories implicated by an inherited schema do not support inheritance, the inheriting schema can be automatically defined in the VCR by the API. In one embodiment, the inheriting schema is defined in the VCR by default.

By way of illustration, the Employee schema located in the Avitech repository inherits from the Person schema located beneath the Schemas hierarchy node in the BEA repository:

```
Schema /Avitech/Employee inherits from /BEA/Schemas/Person = {
    <Name=EmployeeID, Type= Number>,
    <Name=DateofHire, Type=Date>,
    <Name=Salary, Type= Number> }
```

In various embodiments, the link property type (see Table 1) allows for content reuse and the inclusion of content that may not be under control of the VCR. By way of illustration, the value associated with a link property can refer/point to any of the following: a content node in a VCR, an individual property on a content node in a VCR, a file on a file system, an objected identified by a URL (Uniform Resource Locator), or any other suitable identifier. In various embodiments, when editing a content node that has a link property type, a user can specify the link destination (e.g., using a browser-type user interface). In certain aspects of these embodiments, if a link refers to a content node or a content node property that has been moved, the link can be automatically be resolved by the system to reflect the new location.

In various embodiments, a value whose type is lookup (see Table 1) can hold an expression that can be evaluated to search the VCR for instances of content node(s) that satisfy the expression. Nodes that satisfy the expression (if any) can be made available for subsequent processing. In various embodiments, a lookup expression can contain one or more expressions that can substitute expression variables from: the content node containing the lookup property, a user profile, anything in the scope of a request or a session. In various embodiments, an expression can include mathematical, logical and Boolean operators, function/method invocations, macros, SQL (Structured Query Language), and any other suitable query language. In various embodiments, an expression can be pre-processed one or more times to perform variable substitution, constant folding and/or macro expansion. It will be apparent to those of skill in the art that many other types of expressions are possible and fully within the scope and spirit of this disclosure.

In various embodiments, when editing a content node that has a lookup property type, the user can edit the expression through a user interface that allows the user to build the expression by either entering it directly and/or by selecting its constituent parts. In addition, the user interface can enable the user to preview the results of the expression evaluation.

Database mapped property types (see Table 1) allow information to be culled (i.e., mapped) from one or more database tables (or other database objects) and manipulated through node properties. By way of illustration, a company might have "content" such as news articles stored as rows in one or more RDBMS (Relational Database Management System) tables. The company might wish to make use of this "content" via their portal implementation. Further, they might wish to manage the information in this table as if it existed in the VCR. Once instantiated, a content node property that is of the database mapped type behaves as though its content is in the VCR (rather than the database table). In one embodiment, all API operations on the property behave the same but ultimately operate on the information in the database table.

In various embodiments, a given database mapped property type can have an expression (e.g., SQL) which, when evaluated, resolves to a row and a column in a database table (or resolves to any kind of database object) accessible by the system over one or more networks. A database mapped property will be able to use either native database tables/objects or database views on those tables/objects. It will be appreciated by those of skill in the art that the present disclosure is not limited to any particular type of database or resolving expression.

In aspects of certain embodiments, a schema can be automatically created that maps to any row in a database table. The system can inspect the data structure of the table and pre-populate the schema with database mapped properties corresponding to columns from the table. The table column names can be used as the default property names and likewise the data type of each column will determine the data type of each corresponding property. The system can also indicate in the schema which properties correspond to primary key columns. If certain columns from the table are not to be used in the new schema, they can be un-mapped (i.e. deselected) by a user or a process. A content node can be based on such a schema and can be automatically bound to a row in a database table (or other database object) when it is instantiated. In various embodiments, a user can interactively specify the database object by browsing the database table.

In various embodiments, a display template (or "template") can be used to display content based on a schema. Templates can implement various "views". By way of illustration, views could be "full", "thumbnail", and "list" but additional "views" could be defined by end-users. A full view can be the largest, or full page view of the content. A thumbnail view would be a very small view and a list view can be used when displaying multiple content nodes as a "list" on the page (e.g., a product catalog search results page). In various embodiments, the association between a schema and templates can be one-to-many. A template can be designated as the default template for a schema. In certain of these embodiments, templates can be designed with the aid of an integrated development environment (IDE).

In various embodiments and by way of an illustration, display templates can be implemented using HTML (Hypertext Markup Language) and JSP (Java® Server Pages). By way of a further illustration, such a display template can be accessed from a web page through a JSP tag which can accept as an argument the identifier of a content node. Given the content node, the node's schema and associated default display template can be derived and rendered. Alternatively, the JSP tag can take an additional argument to specify a view other than the default. In another embodiment, display templates can be automatically generated (e.g., beforehand or dynamically at run-time) based on a content node's schema. In other embodiments, the view (e.g., full, thumbnail, list) can be determined automatically based on the contents of an HTTP request.

In various embodiments, a role is a dynamic set of users. By way of illustration, a role can be based on functional responsibilities shared by its members. In aspects of these embodiments, a role can be defined by one or more membership criteria. Role mapping is the process by which it is determined whether or not a user satisfies the membership criteria for a given role. For purposes of discussion, a role can be described as follows:

Role=PMembers+[Membership Criteria]

where PMembers is a set of user(s), group(s) and/or other role(s) that form a pool of potential members of this role subject to the Membership Criteria, if any. For a user or a process to be in a role, they must belong to PMembers and satisfy the Membership Criteria. The Membership Criteria can include one or more conditions. By way of illustration, such conditions can include, but are not limited to, one or more (possibly nested and intermixed) Boolean, mathematical, functional, relational, and/or logical expressions. By way of illustration, consider the following Administrator role:

Administrator=Joe, Mary, SuperUser+CurrentTime>5:00 pm

The role has as its potential members two users (Joe and Mary) and users belonging to the user group named Super User. The membership criteria includes a condition that requires the current time to be after 5:00 pm. Thus, if a user is Joe, Marry or belongs to the SuperUser group, and the current time is after 5:00 pm, the user is a member of the Administrator role.

In various embodiments, roles can be associated with Resource(s). By way of illustration, a resource can be any system and/or application asset (e.g., VCR nodes and node properties, VCR schemas and schema properties, operating system resources, virtual machine resources, J2EE application resources, and any other entity that can be used by or be a part of software/firmware of some kind). Typically, resources can be arranged in one or more hierarchies such that parent/child relationships are established (e.g., the VCR hierarchical namespace and the schema inheritance hierarchy). In certain of these embodiments, a containment model for roles is followed that enables child resources to inherit roles associated with their parents. In addition, child resources can override their parents' roles with roles of their own.

In various embodiments, Membership Criteria can be based at least partially on a node's properties. This allows for roles that can compare information about a user/process to content in the VCR, for example. In various embodiments, a node's property can be programmatically accessed using dot notation: Article.Creator is the Creator property of the Article node. By way of illustration, assume an Article node that represents a news article and includes two properties: Creator and State. A system can automatically set the Creator property to the name of the user that created the article. The State property indicates the current status of the article from a publication lifecycle standpoint (e.g., whether the article is a draft or has been approved for publication). In this example, two roles are defined (see Table 2).

TABLE 2

Exemplary Roles in an Embodiment

| ROLE NAME | ASSOCIATED WITH | PMEMBERS | MEMBERSHIP CRITERIA |
| --- | --- | --- | --- |
| Submitter | Article | Article.Creator | Article.State = Draft |
| Approver | Article | Editor | Article.State = (Submitted or Approved) |

The Submitter and Approver roles are associated with the Article node. Content nodes instantiated from this schema will inherit these roles. If a user attempting to access the article is the article's creator and the article's state is Draft, the user can be in the Submitter role. Likewise, if a user belongs to an Editor group and the article's state is Submitted or Approved, then the user can belong to the Approver role.

In various embodiments, a policy can be used to determine what capabilities or privileges for a given resource are made available to the policy's Subjects (e.g., user(s), group(s) and/or role(s)). For purposes of discussion, a policy can be described as follows:

Policy = Resource + Privilege(s) + Subjects + [Policy Criteria]

Policy mapping is the process by which Policy Criteria, if any, are evaluated to determine which Subjects are granted access to one or more Privileges on a Resource. Policy Criteria can include one or more conditions. By way of illustration, such conditions can include, but are not limited to, one or more (possibly nested and intermixed) Boolean, mathematical, functional, relational, and/or logical expressions. Aspects of certain embodiments allow policy mapping to occur just prior to when an access decision is rendered for a resource.

Similar to roles, in certain of these embodiments a containment model for policies is followed that enables child resources to inherit policies associated with their parents. In addition, child resources can override their parents' polices with policies of their own.

In various embodiments, policies on nodes can control access to privileges associated with the nodes. By way of illustration, given the following policies:

Policy1=Printer504+Read/View+Marketing

Policy2=Printer504+All+Engineering the Marketing role can read/view and browse the Printer504 resource whereas the Engineering role has full access to it ("All"). These privileges are summarized in Table 3. Policy1 allows a user in the Marketing role to merely view the properties of Printer504 whereas Policy2 allows a user in the Engineering role to view and modify its properties, to create content nodes based on Printer504 (assuming it is a schema), and to delete the resource.

TABLE 3

Exemplary Privileges for an "Printer504"
Node in Various Embodiments

| ROLE | CREATE | READ/VIEW | UPDATE | DELETE | BROWSE |
|---|---|---|---|---|---|
| Marketing | | x | | | x |
| Engineering | x | x | x | x | x |

Aspects of certain of these embodiments include an implied hierarchy for privileges wherein child privilege(s) of a parent privilege are automatically granted if the parent privilege is granted by a policy. By way of illustration, the Browse privilege can be considered the least dominant of the privileges for the Printer504 node. Addition of any other privilege will implicitly include Browse. For example, if the next step up is the Read/View capability, selection of Read/View will implicitly include the Browse privilege.

In various embodiments, the containment models for polices and roles are extended to allow the properties of a node to inherit the policies and roles that are incident on the node. Roles/polices on properties can also override inherited roles/polices. For purposes of illustration, assume the following policy on a Power property of Printer504:

Policy3=Printer504.Power+Update+Marketing

In Policy3, the Marketing role is granted the right to update the Power property for the printer resource Printer504 (e.g., control whether the printer is turned on or off). By default, the Read/View property is also granted according to an implied privilege hierarchy. (There is no Browse privilege for this property.) See Table 4. Alternatively, if there was no implied privilege hierarchy, the Power property would inherit the read/view privilege for the Marketing role from its parent, Printer504. Although no policy was specified for the Power property and the Engineering role, the privileges accorded to the Engineering role can be inherited from a parent node. These privileges are summarized in Table 4.

TABLE 4

Exemplary Privileges for the "Power" Property
in the "Printer504" Node

| ROLE | CREATE | READ/VIEW | UPDATE | DELETE |
|---|---|---|---|---|
| Marketing | | x | x | |
| Engineering | x | x | x | x |

In various embodiments, the ability to instantiate a node based on a schema can be privileged. This can be used to control which types of content can be created by a user or a process. By way of illustration, assume the following policy:

Policy4=Press_Release+Instantiate+Marketing, Manager

Policy4 specifies that nodes created based on the schema Press_Release can only be instantiated by users/processes who are members of the Marketing and/or Manager roles. In aspects of certain of these embodiments, user interfaces can use knowledge of these policies to restrict available user choices (e.g., users should only be able to see and choose schemas on which they have the Instantiate privilege).

In various embodiments, policies can be placed on schemas. Instances of a schemas (e.g., content nodes), can inherit these policies unless overridden by a more local policy. For purposes of illustration, assume the following policies:

Policy5=Press_Release+Read/View+Everyone

Policy6=Press_Release+All+Public_Relations

TABLE 5

Exemplary Privileges for the "Press Release" Schema

| ROLE | CREATE INSTANCE | READ/VIEW | UPDATE | DELETE | BROWSE |
|---|---|---|---|---|---|
| Everyone | | X | | | x |
| Public Relations | x | X | x | x | x |

With reference to Table 5 and by way of illustration, assume a content node instance was created based on the Press Release schema. By default, it would have the same roles/polices as the Press Release schema. If a policy was added to the node giving a role "Editor" the privilege to update the node, the result would be additive. That is, Everyone and Public Relations would maintain their original privileges.

In various embodiments, policies can be placed on properties within a schema, including property choices. (Property choices are a predetermined set of allowable values for a given property. For example, a "colors" property could have the property choices "red", "green" and "blue".) Instances of a schemas (e.g., in content nodes), would inherit these property policies unless overridden by a more local policy.

In various embodiments, content and schema nodes can follow lifecycles. In certain aspects of these embodiments, a lifecycle can set forth: a set of states through which a node can pass; actions that can occur as part of or resulting from state transitions; and actors that can participate in the lifecycle. By way of illustration, lifecycles can be used to model an organization's content approval process. In various embodiments, lifecycles can be nested within lifecycles. This allows for complex lifecycles to be compartmentalized for easy manipulation and development. Various embodiments include a lifecycle definition, an extensible lifecycle system, an interactive lifecycle design tool to generate and/or modify lifecycle definitions, and means for lifecycles to interact with other systems. If a content repository does not natively support lifecycles, support can be provided by the VCR.

In various embodiments, a lifecycle can be associated with, or be a property of, a node. In aspects of these embodiments, if a lifecycle is associated with a hierarchy node, the children of the hierarchy node will also be associated with the lifecycle. Likewise, if a lifecycle is associated with a schema, nodes instantiated based on the schema will also be associated with the lifecycle. Lifecycles can also be directly associated with content nodes.

In various embodiments and by way of illustration, a node can transition from a current state to a new state. Before, during or after a transition, one or more actions can be performed. Actions can optionally operate on and/or utilize the node. Actions can include any type of processing that can be invoked in the course of the lifecycle. By way of an example, actions can include function/method calls, remote procedure calls, inter-process communication, intra-process communication, interfacing with hardware devices, checking a node into/out of version control, assigning the node to a user, group or role, performing some kind of processing on the node (depending on any policies that may be defined on the node), providing a notification to users, groups and/or roles, and other suitable processing. Actions can also be specified as command(s), directive(s), expression(s) or other constructs that can be interpreted or mapped to identify required processing. For example, high-level action directives such as "publish" could cause a content node to be published, and an e-mail or other message to be sent to certain parties. It will be apparent to those of skill in the art that any action is within the scope and the spirit of the present disclosure.

Figure 2:
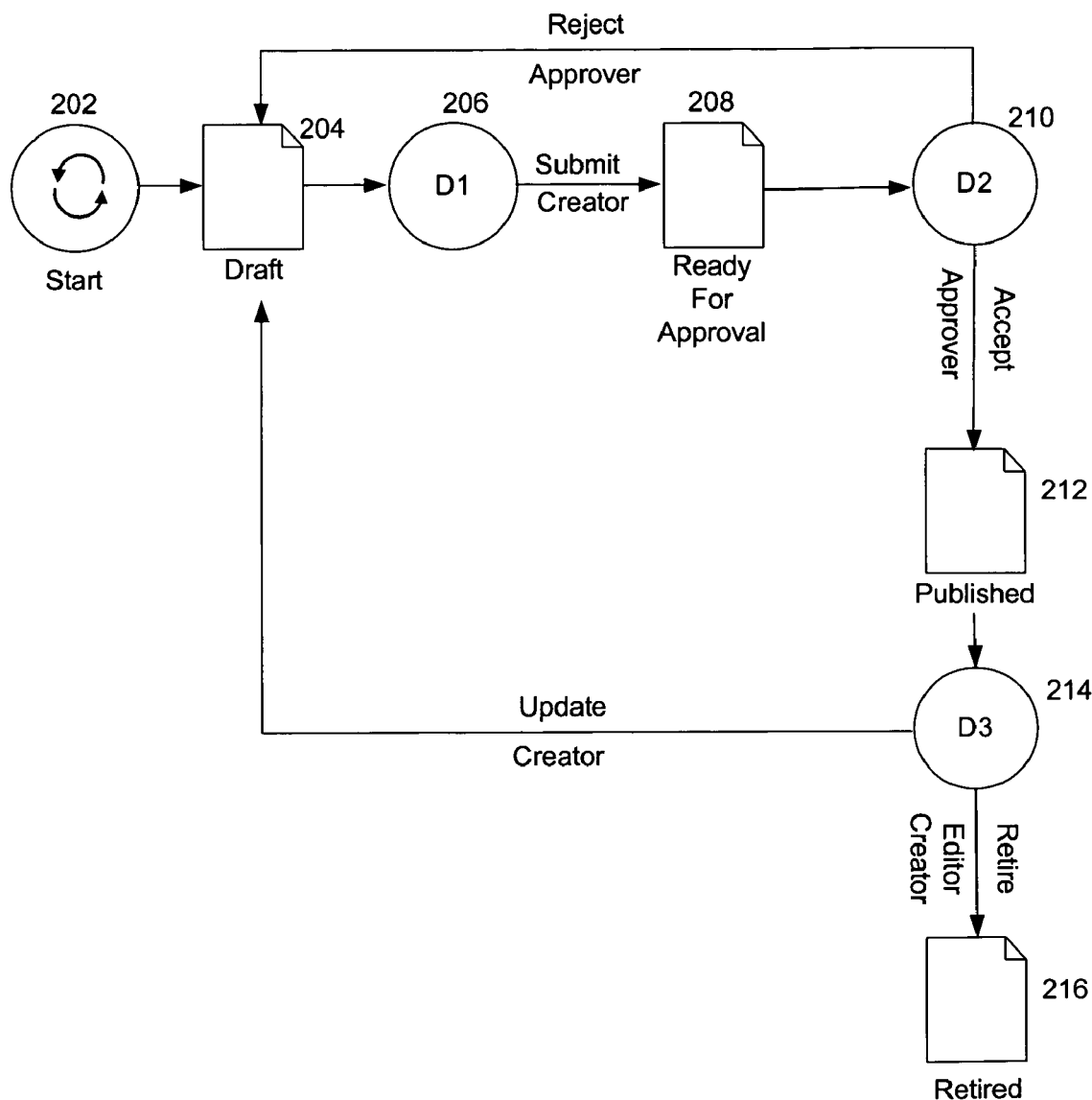
FIG. 2 is an exemplary illustration of a lifecycle in various embodiments of the invention.

An exemplary lifecycle for a content node representing a news article is illustrated in Table 6 and FIG. 2. States are illustrated in FIG. 2 as document icons (204, 208, 212, 216) and decision points between states are illustrated as circles (206, 210, 214). Transitions between states are illustrated as lines that are directed to show the order of states. In aspects of certain of these embodiments, transitions between states can pass through one or more decision points. A decision point is a visual placeholder (e.g., an icon in an IDE graphical editor) for restricting transitions to user(s), groups(s), and role(s); and for specifying action(s) that can accompany a change in state, if any. A decision point can connect a state to at least one other state. Actions can be controlled by policies and/or roles associated with the node and keyed off of the lifecycle state (e.g., state can be a property of a node) to allow certain classes of users/processes privileges in different states.

TABLE 6

Exemplary Lifecycle in Various Embodiments

| CURRENT STATE | ACTION(S) | ROLE(S) | NEXT STATE |
| --- | --- | --- | --- |
| Start | | | Draft |
| Draft | Submit | Creator | Ready for Approval |
| Ready for Approval | Accept | Approver | Published |
| Ready for Approval | Reject | Approver | Draft |
| Published | Retire | Editor, Creator | Retired |
| Published | Update | Creator | Draft |

The exemplary lifecycle in FIG. 2 begins at Start state 202 which has an unrestricted transition to the next state in the lifecycle, the Draft state 204. A transition can be unrestricted or restricted to a set of user(s), group(s) and/or role(s). In aspects of these embodiments, a role can be delegated to a user through delegated administration. By way of illustration, approval capabilities can be based on capabilities in a delegated administration model. In one embodiment, a restriction can provide that only certain authorized users/processes can bring about a transition to the next state. In various embodiments, a state change can be initiated by a user interacting with the node through a tool and/or by a process interacting with the node through the VCR API. In certain aspects of these embodiments, the current state of a node is a property of the node. By way of an example, modifying the state property (e.g., changing it from "Start" to "Draft", assuming the user/process is authorized to do so), can cause attendant lifecycle processing to take place, such as performing actions defined on the transition.

The news article can be modified by user(s) and/or process(es) while in the Draft state and then submitted for approval. By way of an example, a user can check-out the news article (assuming it is under version control), modify it, and then check-in the article with the changes. Before checking the article in, the user can change the state property from "Draft" to "Ready for Approval" in order to bring about a transition to the Ready for Approval 208 state. By way of a further illustration, a user interface can present a button or a menu option that a creator can be selected when the user has finished editing the article. Once selected, the article can be automatically submitted to the lifecycle where it can progress to the next state. In this illustration, the transition through decision point D1 206 to the Ready for Approval state is constrained to users in the Creator role. Thus, only a user/process that created the article can cause the article to transition into the Ready for Approval state.

The transition from Draft to Ready for Approval also has an accompanying action, Submit. By way of an example, this action can cause a notification to be sent to those interested in reviewing articles for approval. Alternatively, or in addition to this, the news article can be assigned to users/groups/roles. In this way, users/processes that are in the assigned users/groups/roles can review it while it is in the Ready for Approval state. From the Ready for Approval state, there is a transition through decision point D2 210. The D2 decision point specifies that a user/process in the Approver role can cause a transition to the Draft state 204 or to the Published state 212. If the transition is to the Draft state, the action associated with the transition will be to Reject the article. A rejected article will repeat the lifecycle path from Draft to Ready for Approval. If the transition is to the Published state, however, the action will be to Accept the article. Once the article is in the Published state, a user/process in the role of Editor or of Creator can cause a transition to the Retired state 216. A user in the role of Creator can cause a transition to the Draft state. Transitioning from the Published state to the Draft state causes an Update action whereas transitioning from the Published state to the Retired state causes a Retire action.

In aspects of these embodiments, roles can be organized into a role hierarchy such that superior roles can skip state transitions required of inferior roles. By way of illustration, suppose the Approver role was superior to the Creator role. If the current lifecycle state of the article was Draft, a user in the role of Approver could skip the Ready for Approval state and transition the article all the way to the Published state. In one embodiment, actions associated with the decision points D1 and D2 could be automatically invoked even though the Ready for Approval state was skipped.

In various embodiments and by way of illustrations, lifecycles can be defined using a text editor and/or an IDE. From a text editor a user can create a full lifecycle definition in a language (e.g., XML). In a graphical environment, a user can create different states and then connect them together to represent transitions. In an embodiment, a graphical depiction of a lifecycle can appear as in FIG. 2. Graphical representations of states and decision nodes can be placed onto an IDE canvas and connected to form transitions. Property sheets associated with the graphical objects can allow a user to interactively specify roles and actions associated with states and/or transitions. In aspects of these embodiments, a user can easily switch between graphical and textual representations of a lifecycle since both representations are equivalent.

In various embodiments, third party lifecycle engines can be invoked. This allows additional functionality to be seamlessly incorporated into the lifecycle model. In one embodiment, this can be accomplished from within a lifecycle through lifecycle actions. In another embodiment, third party lifecycles can be invoked through a callback mechanism. By way of illustration, the VCR API can invoke a third party lifecycle in response to certain events, such as when a content node/scenario has been modified and/or its state property has changed. In this illustration, a process which implements a third party lifecycle can register to receive callbacks when these events occur. The callback notification can also include the VCR node identifier and optionally context information such as information about the user/process that caused the event.

In various embodiments, lifecycles can be utilized from other processes. The VCR API includes a lifecycle interface to allow access to a node's lifecycle definition. In addition, the lifecycle interface allows a process to drive a node through the lifecycle by providing functionality such as the ability to ascertain a node's current state, place the node in a new state based on transition choices available from its current state, and invoke actions associated with a state transition.

Figure 3:
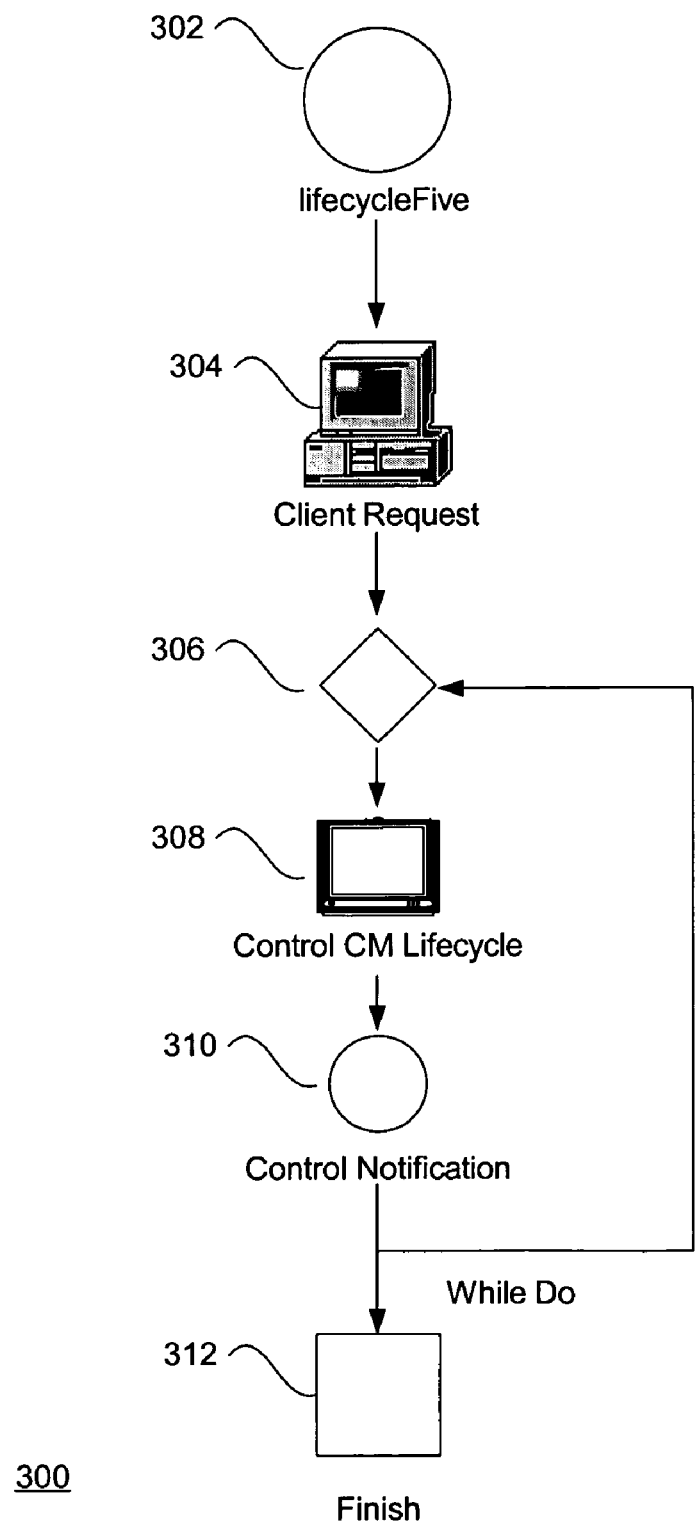
FIG. 3 is an exemplary illustration of an external scenario that invokes a lifecycle in various embodiments.

FIG. 3 is an illustration of an exemplary external scenario that invokes a lifecycle in various embodiments. From an IDE, a user can create a visual representation of a scenario as depicted in FIG. 3. In this illustration, the scenario includes a starting point 302 icon followed by a client request control icon 304 that represents a process for receipt of a client request. After the request is received, the scenario enters a "while" loop 306. Within the loop, a lifecycle control icon 308 representing a VCR lifecycle causes the associated lifecycle to be invoked. The lifecycle control can have associated properties that identify the lifecycle and the node that it will drive through the lifecycle. In aspects of these embodiments, a control can be a Java™ control. The lifecycle control can drive the node through the lifecycle using the lifecycle interface of the VCR API. After the lifecycle has completed, the scenario invokes a notification control 310 that can cause a notification of lifecycle completion to be sent to various user/process.

Various embodiments of the system include a version control capability that is available for nodes such that a history of states is maintained over the lifetime of a node. In various embodiments, one version of a node is considered the published version. In certain aspects of these embodiments, versions are given names (or other suitable identifiers) and can be stored or accessed via a version list associated with the particular node. In aspects of these embodiments, the VCR can provide support for versioning if the repository in which the node is persisted does not.

In various embodiments, a version of a node can also include identification of the user/process that last modified the version and a description or comment. A node under version control can be moved or copied within the VCR. In various embodiments, version history travels with the node during a move or a copy. When the user or a process moves a content node the history of that node moves with it. In case of a roll back, parent version of the roll back can be indicated in the history. In various embodiments, a node's version can be "rolled back" (i.e., restored) to a previous version. In aspects of these embodiments, upon roll back the selected content node version to restore becomes the latest version of the content node. In certain of these embodiments, the rolled back version is automatically given a new version identifier (e.g., old version number+1).

Each node can have a lock (e.g., semaphore or other suitable means for controlling access to the node). Locks prevent a node from being modified by more than one user/process at the same time. When a node is checked-out of version control, the user acquires the lock. Lock acquisition prevents others from checking-out versions associated with the node until it is checked-in. Locks can be employed on the node level or on the version level. If version-level locks are employed, it is possible for more than one version of a node to be checked-out at the same time. Version control can be turned on/off for a given node, repository, and/or VCR. In one embodiment, a node that does not utilize version control has only a single version in its version list.

Versioning includes the ability for a user or a process to check-out a node version for editing. By way of illustration, a user can click on an item in a tree browser view of a VCR (see FIG. 4 and accompanying text). In aspects of these embodiments, a user or process can choose which version of a node to check out. The tree browser can display (e.g., via a pop-up menu or tool tip) the following information for each version: version number/identifier, date version was last saved, the user/process that performed the last save, and optional comment(s). In various embodiments, a user can select the version to check-out by interactively browsing the version history of a particular node with the aid of a user interface such as a tree browser. In one embodiment, the most recent version of a node is checked-out by default if the version is not specified.

In one embodiment, a user interface can provide a rendering of a node's properties. For example, a user can select an 'Edit Content' button in order to edit the node's properties. This action can attempt to check-out the node if it is not already checked-out. In various embodiments, a given user's checked-out nodes appear in the user's workspace (see FIG. 4). The user can save their work until check-in time. In various embodiments, nodes that are "saved" do not change versions or produce a version increment. From other users' perspective the node is still checked-out. Once a user has finished editing, any changes can be discarded or checked into the VCR.

Upon check-in, a new version of the node is available in the system. In various embodiments, checking-in a node causes the node to appear in the VCR but not in the user's workspace. A user/process can enter a description of the changes made to the node during check-in time. The description can be saved along with the version. Checking a node into the workspace also causes the associated lock to be released (so that others can edit) and, if versioning is turned on, creates a new version of the node. However, it the user merely saves their work rather than checking it in, the node will remain in the workspace and a new version will not be generated. In aspects of these embodiments, if a lifecycle is associated with the node, checking the node in can submit the node to the lifecycle.

By way of a illustration and with reference to FIG. 2, a user in the role of an Creator can submit a news article for approval by changing the news article's state to "Ready for Approval" and then checking it in. In one embodiment, a drop-down list of states to which the state property can be assigned is made available to the user. The drop-down list can be filtered based on the user's role and/or the stage of the lifecycle. After check-in, the workspace of a user in the role of Approver updates to show the news article as an item assigned to the user. In various embodiments, the Approver could also receive an alert (e.g., e-mail, instant message, page, etc.) to indicate that the news article is available for review. If the approver chooses to edit the news article, the approver can check it out. Once the approver acquires the lock, this item will disappear from the 'Assigned Items' part of the workspace of everyone else in the Approver role.

In various embodiments, a user/process can navigate to a node and perform a delete action. In one embodiment, deleting a node changes its state (e.g., to Retired or Deleted). A user can view all deleted nodes at a later time and choose to permanently delete them or to un-delete them. In another embodiment, deleting a node permanently removes it from the VCR. In one embodiment, a node can be deleted regardless of its lifecycle state. In one embodiment, a node cannot be deleted if it is checked-out. In one embodiment, deleting a node causes all of the node's children to be deleted. In one embodiment, only a node's checked-in children are deleted. In yet another embodiment, a deleted node (and, optionally, its children) can be un-deleted.

FIG. 4 is an exemplary user interface in various embodiments of the invention. By way of an example, a user interface can include one or more of the following: 1) a graphical user interface (GUI) (e.g., rendered with Hypertext Markup Language); 2) an ability to respond to sounds and/or voice commands; 3) an ability to respond to input from a remote control device (e.g., a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular user interface. Those of skill in the art will recognize that many other user interface embodiments are possible and fully within the scope and spirit of this disclosure.

A user interface according to various embodiments and by way of illustration can include an interactive graphical tree browser as is well known in the art to allow users to explore and interact with the VCR and their workspace. A tree browser presents a hierarchical view of nodes and schemas. The indentation level of a node indicates parent/child relationships. In various embodiments, the tree browser can present one or more views of the VCR. These views can include (but are not limited to), published nodes, unpublished nodes, retired nodes, deleted nodes, assigned nodes, locked nodes, and nodes waiting for approval. In aspects of these embodiments, a user can customize the tree browser to include one or more of these views. The views can be presented as separate trees or as a merged tree. In various embodiments, views can be automatically customized to particular user(s). For example, roles and/or polices that adorn nodes can be used to filter the view. By way of illustration, the assigned items view and waiting for approval view will only show nodes that are applicable to a given user. In one embodiment, this can be accomplished by examining roles in lifecycle transitions and filtering out nodes for lifecycles that a given user cannot interact with.

By way of illustration, a tree browser can expose VCR 400, the federated root. It contains two repositories (Neptune 402 and Pluto 412) and a Public hierarchy node 426. In various embodiments, nodes can be decorated with a folder or related visual symbol to indicate their purpose. In aspects of these certain embodiments, selection of a folder icon or hierarchy node name causes the contents of the node to expand beneath it in the tree. In further aspects of these embodiments, selection of any type of node can allow a user to edit the properties of the node. In one embodiment, schemas can be defined anywhere in the VCR, including directly beneath the federated root (not shown). Schemas that are not defined in a repository (e.g., 428, 430 and 434) are considered virtual in various embodiments. The Neptune repository 402 contains two repository nodes: Press Releases 404 and Old Schemas 408. Press releases contains a content node named Japan Account 406, which is currently locked (e.g., checked-out) as indicated by the padlock icon next to its name. Only the user who has checked-out the node can edit it. Others can optionally view it depending on roles and/or privileges. The Old Schemas hierarchy node contains a schema named Account Schema 410 which is currently unlocked. In aspects of these embodiments, a node's properties can be viewed by selecting the node in the tree browser. If the selected node is not locked, the system can automatically attempt to obtain a lock on behalf of the user.

The Pluto repository includes a schema 414 and two top-level hierarchy nodes (416, 418). One of the hierarchy nodes, 2003 Memos 416, has a folder symbol that is a solid color, the other has an outline of a folder symbol 418. In one embodiment, a special visual symbol (e.g., a solid folder icon) can indicate to a user that the hierarchy node has a schema and/or a lifecycle associated with it. In various embodiments, associating a schema and/or a lifecycle with a hierarchy node results in the schema and/or lifecycle being imposed on or inherited by the children of the hierarchy node. The 2004 Memos hierarchy node contains another hierarchy node 420, an unlocked content node 422 and a locked content node 424.

In various embodiments, the user interface can provide a logical Workspace folder 436 that provides quick access to a user's new, checked-out and assigned items. Assigned items are those items which are assigned to one or more users, groups and/or roles according to a lifecycle or some other suitable means. In this illustration, there are two nodes assigned to the user: Japan Account 444 and Internal Memo Schema 446. The user has checked-out Japan Account node since it appears in the VCR tree with a padlock beside it unlike the Internal Memo Schema which is not currently checked-out. The user has not checked-out the Staff Change schema 434 since it does not appear in their Workspace (i.e., another user or process has checked it out). In various embodiments, by selecting the Staff Change schema 434 the user can discover who holds the lock and when they obtained it.

In various embodiments and by way of a further illustration, new nodes can be created. Newly created nodes can appear in the workspace of the user that created them until they are published in the VCR. Aspects of certain of these embodiments allow a user to create new nodes through a user interface that enables the user to select in which VCR, repository or hierarchy node the new node will reside. The user can indicate whether a version history should be maintained for the new node and can add properties to it or base its properties on a schema. A lifecycle for the new node can also be specified. A tree browser can be updated to reflect the addition of the new node.

Figure 5:
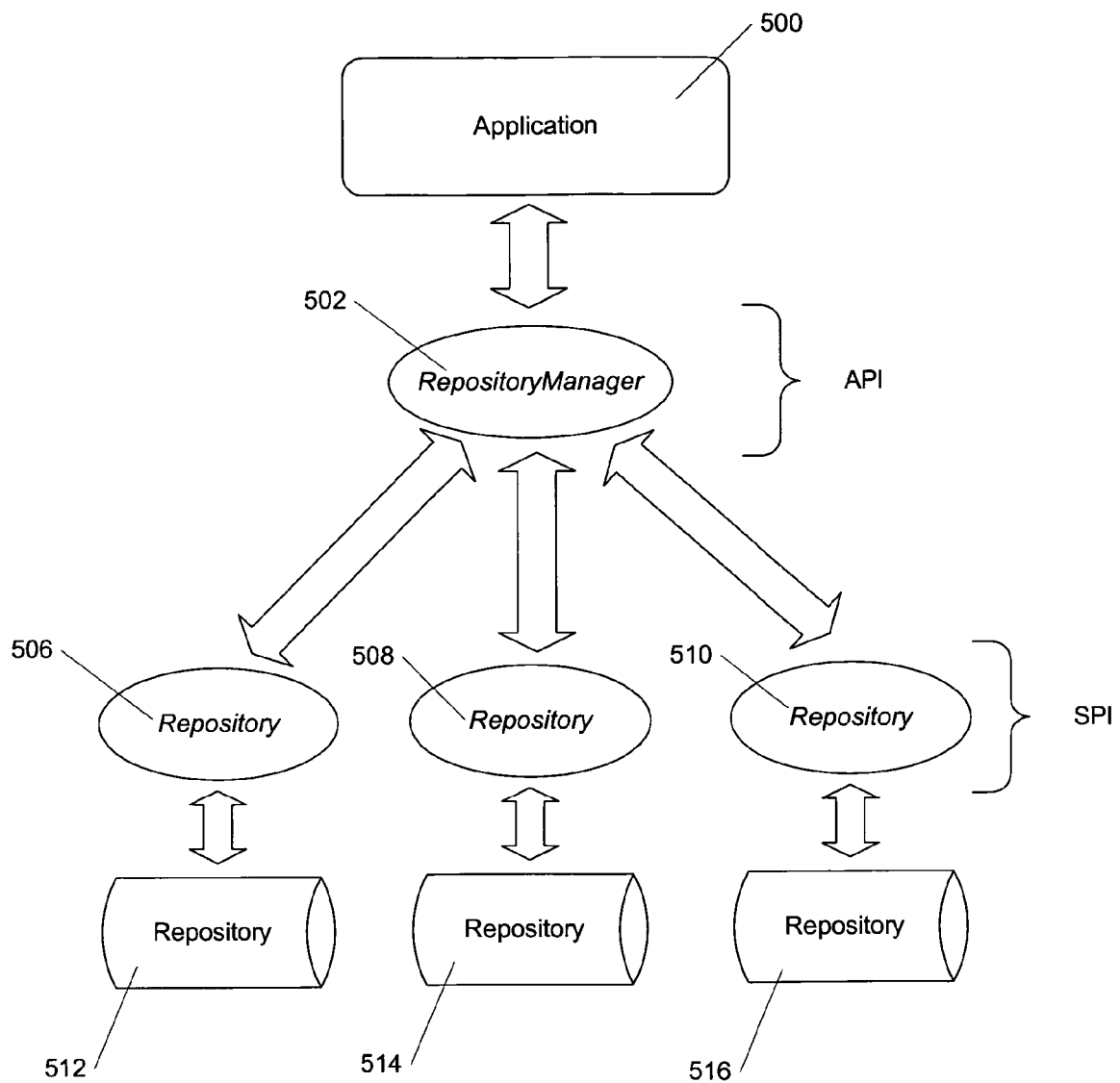
FIG. 5 is an exemplary illustration of objects/interfaces that can be used in connecting a repository to a VCR in various embodiments of the invention.

FIG. 5 is an exemplary illustration of objects/interfaces that can be used in connecting a repository to a VCR in various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The RepositoryManager 502 can serve as an representation of a VCR from an application program's 500 point of view. In aspects of these embodiments, the RepositoryManager attempts to connect all available repositories to the VCR (e.g., 512-516); optionally with user or process credentials. In various embodiments, this can be based on the Java™ Authentication and Authorization Service (available from Sun Microsystems, Inc.). Those of skill in the art will recognize that many authorization schemes are possible without departing from the scope and spirit of the present disclosure. Each available content repository is represented by an SPI Repository object 506-510. The RepositoryManager can invoke a connect( ) method on the set of Repository objects. In various embodiments, the RepositoryManager return a list of repository session objects to the application program, one for each repository for which a connection was attempted. Any error in the connection procedure can be described by the session object's state. In another embodiment, the RepositoryManager can connect to a specific repository given the repository name. In various embodiments, the name of a repository can be a URI (uniform resource identifier).

Figure 6:
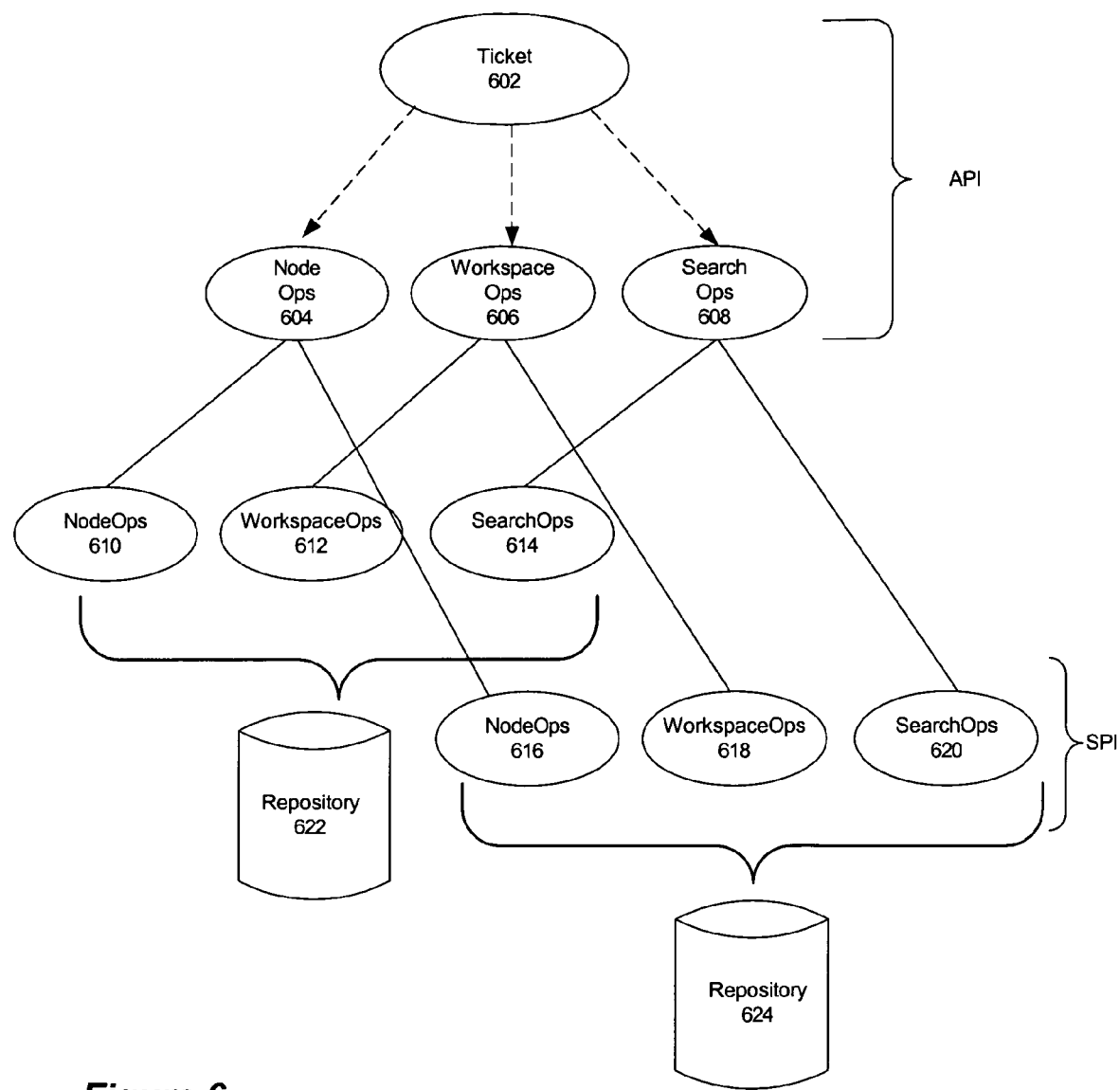
FIG. 6 is an exemplary illustration of objects/interfaces that can be used as service model in various embodiments of the invention.

FIG. 6 is an exemplary illustration of objects/interfaces that can be used as service model in various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Referring to FIG. 6, a dashed arrow indicates that the object/interface from which the arrow emanates can produce at run-time objects/interfaces to which the arrow points. A Ticket 602 is an API level object/interface that provides access to VCR service object/interfaces: NodeOps 604, WorkspaceOps 606 and SearchOps 608. Each repository connected to the VCR provides implementations of certain of these objects/interfaces as part of the SPI. A Ticket 602 object/interface is intended to be light-weight. As such, one or more may be created and possibly cached for each application/process accessing the VCR. A ticket can utilize a user or a process's credentials to authorize a service. In various embodiments, a ticket can be an access point for NodeOps 604, WorkspaceOps 606, and SearchOps 608.

By way of illustration, repository 622 provides NodeOps 610, WorkspaceOps 612 and SearchOps 614. Repository 624 provides NodeOps 616, WorkspaceOps 618 and SearchOps 620. API level objects/interfaces communicate with their corresponding SPI level objects/interfaces. In this way, an operation on an API-level object can be distributed to each repository such that each repository can work in parallel to perform the requested operation. Accordingly, an operation that might take on average time M*N to perform on all repositories sequentially in theory might only require time M, where N is the number of repositories in the VCR.

The NodeOps 604 provides create, read, update, delete methods for nodes and node properties in the VCR. In aspects of these embodiments, nodes and properties can be operated on based on an identifier, a path in the VCR or through any other suitable relative or absolute reference. When the API NodeOps 604 receives a request to perform an action, it can map the request to one or more SPI NodeOps (610, 616) which in turn fulfill the request using their associated repositories. In this way, applications and libraries utilizing the API see a single VCR rather than individual content repositories. NodeOps functionality exposed in the API can include the following:

Update a given node's properties and property definitions.
Copy a given node to a new location in a given hierarchy along with all its descendants.
Create a new content node underneath a given parent.
Create a new hierarchy node underneath a given parent.
Perform a full cascade delete on a given node.
Retrieve all the nodes in a given node's path including itself.
Retrieve content node children for the given parent node.
Retrieve hierarchy node children for the given parent node.
Retrieve a node based on its ID.
Retrieve a node based on its path.
Retrieve the children nodes for the given hierarchy node.
Retrieve the parent nodes for the given hierarchy node.
Retrieve all the nodes with a given name.
Retrieve the Binary data for given node and property ids.
Moves a node to a new location in the hierarchy along with all its descendants.
Renames a given node and implicitly all of its descendants paths.
Get an iterator object which can be used to iterate over a hierarchy.

In various embodiments, WorkspaceOps 606 exposes services for versioning, including the services to check-in/check-out nodes, node/property locking, access node version history, lifecycle manipulation, labeling, and jobs. When the API WorkspaceOps 606 receives a request to perform an action, it can map the request to one or more SPI WorkspaceOps (612, 618) which in turn fulfill the request using their associated repositories. WorkspaceOps functionality exposed in the API can include:

check-in: Unlocks the node and saves the node along with it's working version.
check-out: Locks the node such that only the user/process that locked it may save or check it in and creates a new working version.
copy: Recursively copies the published source node to the destination.
create: Creates a new Node and also a working version for it, if attached to the node.
delete: Deletes a node version with the given version.
get: Gets the Node at the given path.
get versions: Returns all versions for the given Virtual Node.
save: Saves the node and the working version of the node (if attached to the node), which is the current version on the node.
submit: Submits the node to it's life cycle.

In various embodiments, SearchOps 608 provides API searching services for retrieving nodes, properties, and/or property values throughout the entire VCR based on one or more search expressions. When the API SearchOps 608 receives a request to perform an action, it can map the request to one or more SPI SearchOps (614, 620) which in turn fulfill the request using their associated repositories. The API SearchOps 608 combines the search results from each SPI SearchOps into a result set. In various embodiments, result sets can be refined by performing a further searches on the items in the result set.

Search expressions can include (but are not limited to) one or more logical expressions, Boolean operators, nested expressions, variables, identifiers node names, function/method invocations, remote procedure calls, mathematical functions, mathematical operators, string operators, image operators, and Structured Query Language (SQL). Search expressions can also include support for natural language queries, keyword searching, fuzzy logic, proximity expressions, wildcard expressions, and ranging search types. In various embodiments, the result set can be tailored according to roles/policies in effect on the items that satisfy the search expressions. Those items which a user/process does not have permission to view can be filtered during the search or after the results have been gathered.

In aspects of these embodiments, search results can be ranked according to ranking algorithms and criteria. In one embodiment, a ranking algorithm can rank the result set according to what extent items in the result set satisfy the search expression(s). It will be apparent to those of skill in the art that many other ranking algorithms are possible and fully within the scope and spirit of the present disclosure. In various embodiments, multiple ranking algorithms can be applied to the result set. In one embodiment, the ranking criteria for a given ranking algorithm can be adjusted by a user/process.

In various embodiments, jobs provide the ability to perform VCR operations on sets of nodes. By way of illustration, a job can be used to check-in and check-out a set of nodes as a group, or send a group of nodes through a lifecycle together. In aspects of these embodiments, a job identifier and/or a label can be associated with a node to indicate its inclusion in a particular job and/or label set. In one embodiment, if a job becomes ready for approval, all nodes in the job will reach this state. In various embodiments, a label can be used to tag a repository or a group of nodes. By way of illustration, this provides a way to refer to a set of nodes with different versions. By way of further illustration, labels can be used to in search expressions.

In various embodiments, information in the VCR can be exported in an external format. In aspects of these embodiments, the external format can be XML or another suitable language/representation (e.g., HTML, natural language, a binary file) that can preserve the hierarchical structure of the information. Exporting of all or some of the VCR nodes allows "snapshots" of the VCR for backing-up the VCR, transporting information in the VCR to another repository, and reloading the nodes at a later date. In various embodiments, a node and all of its children will be exported by an export process. By way of an example, if the federated root was chosen to be exported, the entire VCR would be exported. By way of a further example, an export process can recursively traverse the VCR (e.g., depth-first or bread-first traversal), serializing information associated with each node that is visited (e.g., content, hierarchy and schema nodes). Aspects of these embodiments have a "preview" mode where it is reported what information (e.g., nodes, lifecycles, roles, policies) would be exported.

In various embodiments, an import process can do the work of the export process in reverse by de-serializing each node (and other information) and adding it at the appropriate place in the VCR namespace. In another embodiment, the import process can install nodes beneath a chosen node rather then in their original location. As with the export process, aspects of these embodiments have a "preview" mode where it is reported what information (e.g., nodes, lifecycles, roles, policies) would be imported into the VCR. In addition to node properties, various embodiments allow the export and import of version history, roles and/or policies associated with content and schema nodes.

Figure 7:
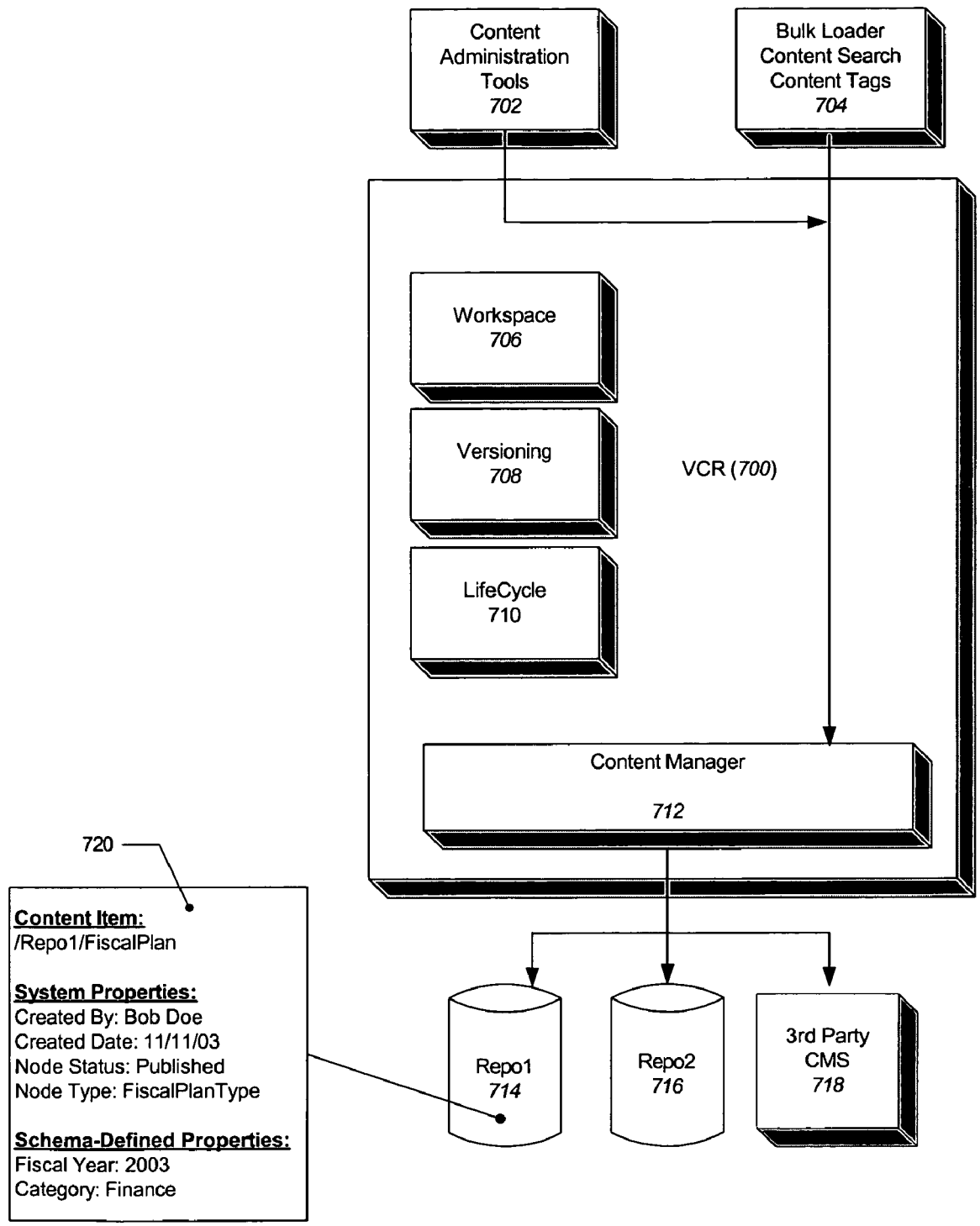
FIG. 7 is an exemplary illustration of content creation while VCR content services are disabled in accordance to various embodiments of the invention.

FIG. 7 is an exemplary illustration of content creation while VCR content services are disabled in accordance to various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

FIG. 7 shows a VCR 700 with two integrated repositories (714, 716) and an integrated third party content management system 718. Although not depicted, each of the subsystems (714-718) can implement an SPI that allows for its integration into the VCR. Also illustrated are content services provided by the VCR including user workspace management 706, content versioning 708 and lifecycle management 710. In addition to federation, the VCR can provide one or more of its content services to subsystems that lack them. By way of illustration, if repository Repo1 does not natively support versioning, the VCR can automatically provide this service for nodes in that repository.

Box 702 represents one or more content administration tools which can be used to create, modify and delete information in the VCR. These tools can take advantage of the VCR's content services. Box 704 represents one or more tools that can operate on repositories without the need for content services. By way of example, these can include bulk content loaders, content searching tools and content tags. A content manager API component 712 can be used to manage interaction between the VCR and its integrated subsystems.

FIG. 7 illustrates the creation of a content node wherein the VCR's content services are not enabled. Box 720 represents the content node named FiscalPlan located in the VCR at /Repo1/FiscalPlan and stored in repository Repo1. The node also has default system proprieties, e.g. Created By, Created Date, Node Status, and Node type. The node type is a schema called FiscalPlanType which has properties Fiscal Year and Category. In this instance, these properties have been set to 2003 and "Finance," respectively. Notice also that the Node Status is "Published."

Figure 8:
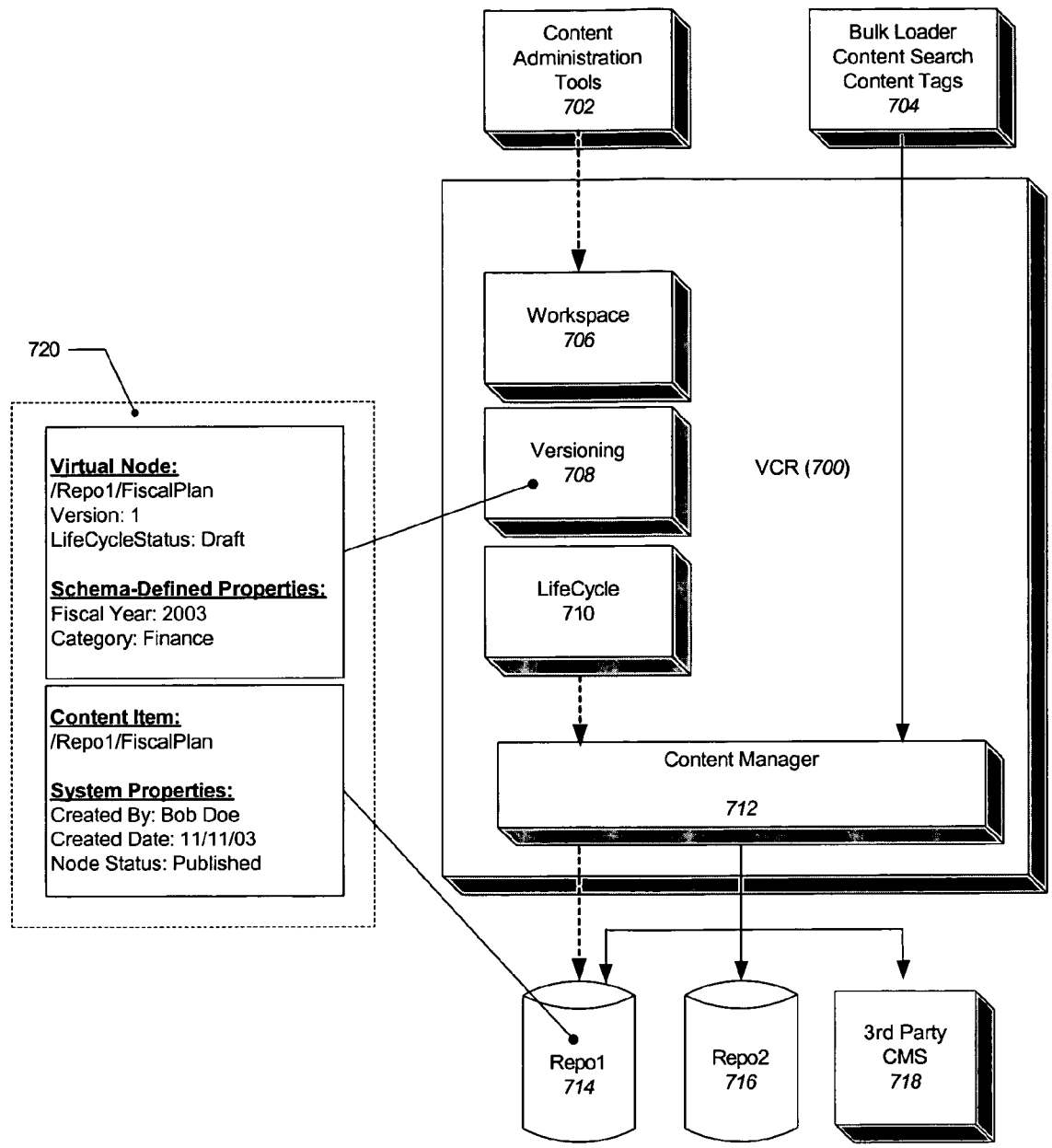
FIG. 8 is an exemplary illustration of content creation while VCR content services are enabled in accordance to various embodiments of the invention.

FIG. 8 is an exemplary illustration of content creation while VCR content services are enabled in accordance to various embodiments of the invention. This example is similar to that in FIG. 7, however content services are enabled in the VCR. The same content node /Repo1/FiscalPlan is created but using the content administration tools (which utilize content services). The system first creates a content item in Repo1 containing system properties as before. However, the schema-defined properties are stored in the VCR as a first version of the node rather than in Repo1, since Repo1 has no versioning capability. In addition to a version number, the node now also includes a lifecycle status to indicate which lifecycle state the node is in. In this example, the node's lifecycle status is "Draft." The system can also lock version 1 for the user who created it and provide access to the node through that user's workspace. When the user checks the node in, it is submitted to its lifecycle (if any).

Figure 9:
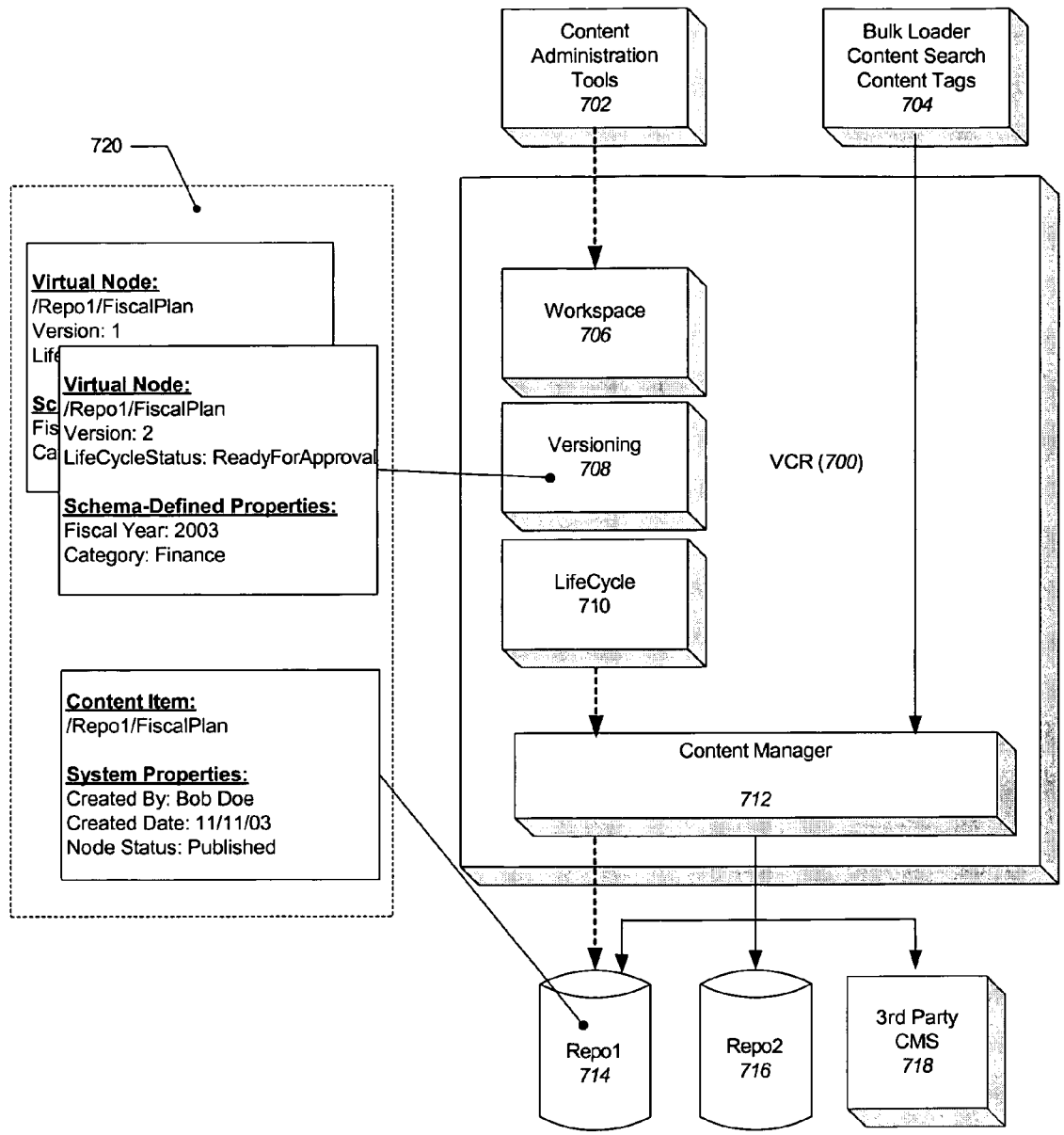
FIG. 9 is an exemplary illustration of modifying a node in the VCR while content services are enabled in accordance to various embodiments of the invention.

FIG. 9 is an exemplary illustration of modifying a node in the VCR while content services are enabled in accordance to various embodiments of the invention. This figure follows from the FIG. 8 discussion above. In this illustration, the node /Repo1/FiscalPlan is checked out by a user, which has the effect of creating a new version (version 2) in the VCR, locking the new version, and assigning it to the user. Here, the user has changed the lifecycle status to "ReadyForApproval." When the node is checked in, its schema-defined properties are saved to version 2. In addition, the system releases the lock and submits the node to its lifecycle. By way of illustration, this may have to effect of placing the node in the workspaces of users in a given role (e.g., the publisher role).

Figure 10:
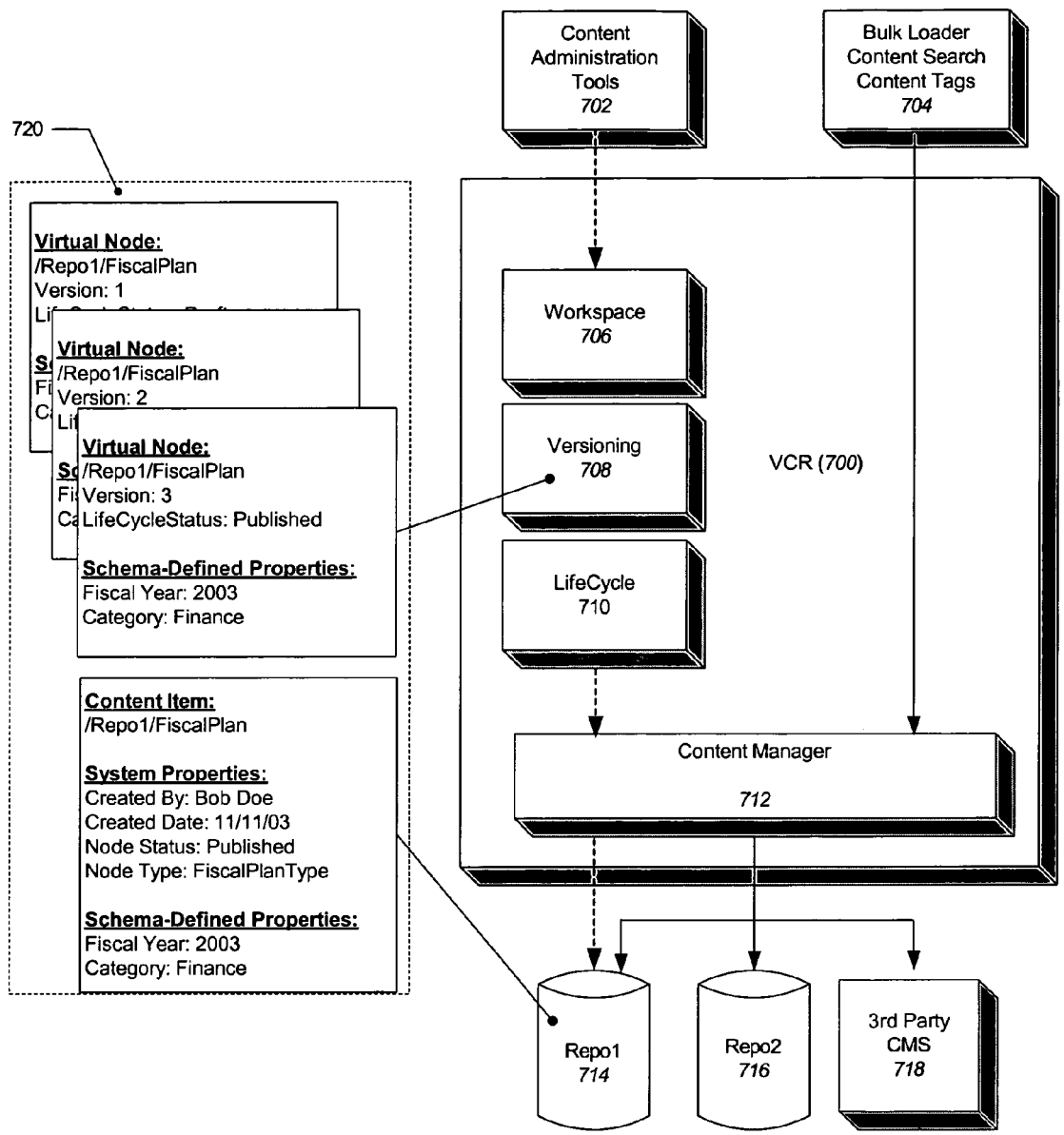
FIG. 10 is an exemplary illustration of publishing a node in the VCR while content services are enabled in accordance to various embodiments of the invention.

FIG. 10 is an exemplary illustration of publishing a node in the VCR while content services are enabled in accordance to various embodiments of the invention. This figure follows from the FIG. 9 discussion above. In this illustration, the node /Repo1/FiscalPlan is again checked out by a user, which has the effect of creating a new version (version 3) in the VCR, locking the new version, and assigning it to the user. Here, the user has changed the lifecycle status to "Published." When the node is checked in, the schema-defined properties are saved to version 3. In addition, the system unlocks the node and publishes its schema-defined properties and the Node Type from version 3 to Repo1.

Figure 11:
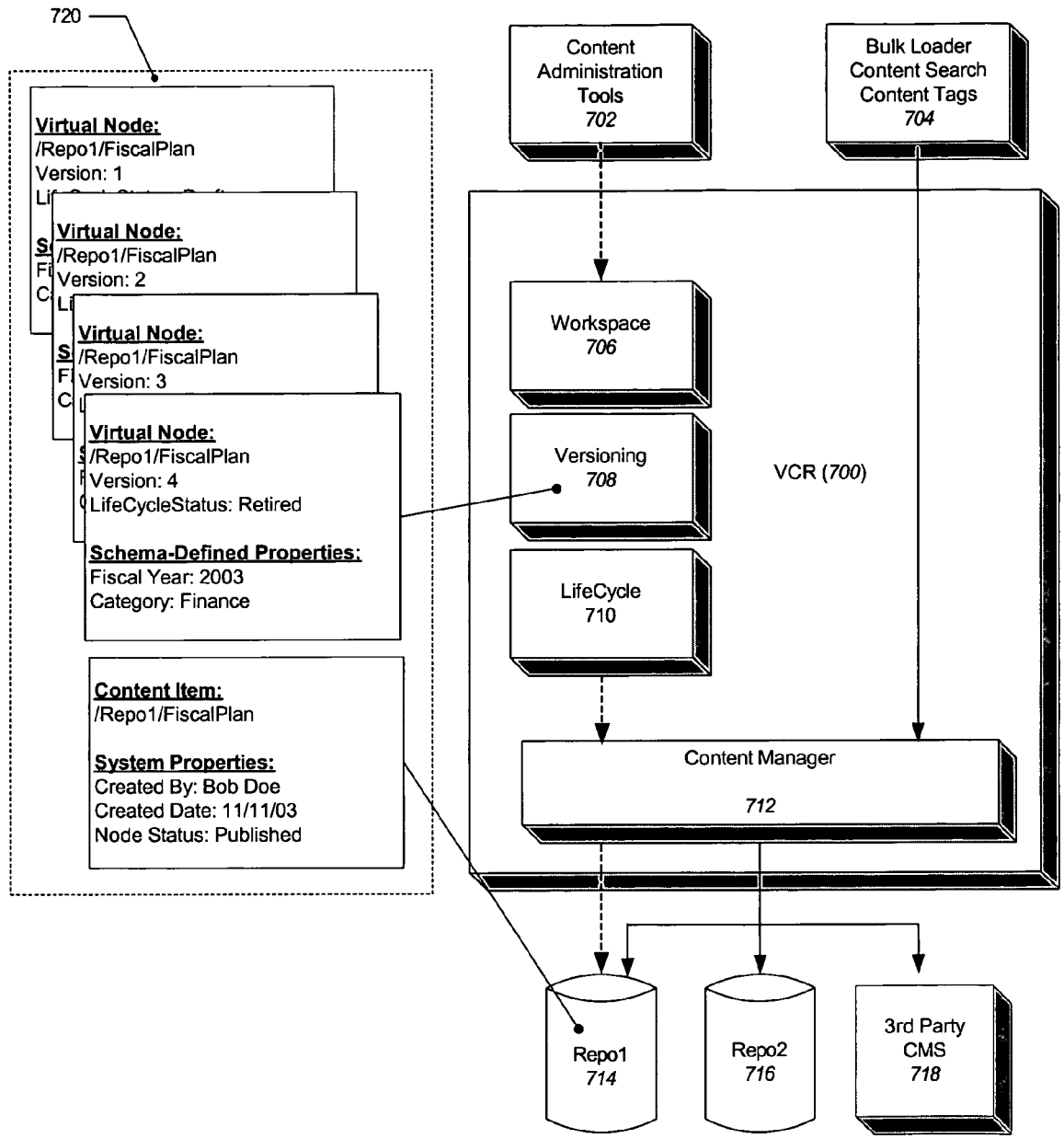
FIG. 11 is an exemplary illustration of retiring a node in the VCR while content services are enabled in accordance to various embodiments of the invention.

FIG. 11 is an exemplary illustration of retiring a node in the VCR while content services are enabled in accordance to various embodiments of the invention. Following from FIG. 10, the node /Repo1/FiscalPlan is again checked out by a user, which has the effect of de-publishing it and creating a new version (version 4) in the VCR, locking the new version, and assigning it to the user. Here, the user has changed the lifecycle status to "Retired." When the node is checked back in, the schema-defined properties are saved in the VCR to version 4 and the node is unlocked. In addition, the system removes (i.e. de-publishes) the node's, schema-defined properties and its Node Type as found in Repo1.

Various embodiments may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

Various embodiments include a computer program product which is a storage medium (media) having instructions stored thereon/in which can be used to program a computing device to perform any of the features presented herein. The storage medium can include, but is not limited to, any type of physical media including floppy disks, optical discs, DVDs, CD-ROMs, microdrives, magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Various embodiments include a computer program product that can be transmitted over one or more public and/or private networks wherein the transmission includes instructions which can be used to program a computing device to perform any of the features presented herein.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for providing a lifecycle for schema in a virtual content repository (VCR), comprising:
   integrating a plurality of repositories into the VCR so that individual repositories appear and behave as a single repository to an application;
   storing a content in the VCR, so that the content is accessible through a logical namespace that encompasses the plurality of repositories;
   associating a schema with the content; and
   transitioning the schema through a set of states according to a lifecycle definition;
   wherein the content is accessible through a logical namespace that encompasses the plurality of repositories.

2. The method of claim 1 wherein:
   the schema can go from a first state to at least one other state where there is a transition between the first state and the at least one other state.

3. The method of claim 2 wherein:
   the transition can be constrained to at least one of: a user, a group of users, a role, and a capability.

4. The method of claim 2, further comprising:
   performing an action associated with the first state, the at least one other state, or the transition.

5. The method of claim 4 wherein:
   the action can be constrained by at least one of: a policy and a role.

6. The method of claim 4 wherein:
   the action can include one of: a function/method call, a remote procedure call, inter-process communication, intra-process communication, interfacing with a hardware device, checking the content into/out of version control, processing the content, providing a notification to a user.

7. The method of claim 1 wherein:
   a state change can be initiated by a user or a process.

8. The method of claim 1, further comprising:
   maintaining a version history to track changes to the schema.

9. The method of claim 1 wherein the step of integrating includes:
   implementing a service provider interface (SPI) that is compatible with the VCR.

10. A system for providing a lifecycle for schema, comprising:
    a virtual content repository (VCR);
    a plurality of repositories integrated into the VCR so that individual repositories appear and behave as a single repository to an application; and
    a lifecycle definition defining a set of states the schema can go through;
    wherein the schema is associated with a content stored in the VCR; and
    wherein the content is accessible through a logical namespace that encompasses the plurality of repositories.

11. The system of claim 10 wherein:
    the schema can go from a first state to at least one other state where there is a transition between the first state and the at least one other state.

12. The system of claim 11 wherein:
    the transition can be constrained to at least one of: a user, a group of users, a role, and a capability.

13. The system of claim 11 wherein:
    an action associated with a state or a transition is performed.

14. The system of claim 13 wherein:
    the action can be constrained by at least one of: a policy and a role.

15. The system of claim 13 wherein:
    the action can include one of: a function/system call, a remote procedure call, inter-process communication, intra-process communication, interfacing with a hardware device, checking the content into/out of version control, processing the content, providing a notification to a user.

16. The system of claim 10 wherein:
a state change can be initiated by a user or a process.

17. The system of claim 10, further comprising:
a version history to track changes to the schema.

18. The system of claim 10, further comprising:
a service provider interface (SPI) that is compatible with the VCR.

19. A machine readable medium having instructions stored thereon that when executed by one or more processors cause a system to:
  integrate a plurality of repositories into a virtual content repository (VCR) so that individual repositories appear and behave as a single repository to an application;
  store the content in the VCR, so that the content is accessible through a logical namespace that encompasses the plurality of repositories;
  associate a schema with the content; and
  transition the schema through a set of states according to a lifecycle definition;
  wherein the content is accessible through a logical namespace that encompasses the plurality of repositories.

20. The machine readable medium of claim 19 wherein:
the schema can go from a first state to at least one other state where there is a transition between the first state and the at least one other state.

21. The machine readable medium of claim 20 wherein:
the transition can be constrained to at least one of: a user, a group of users, a role, and a capability.

22. The machine readable medium of claim 20, further comprising instructions that when executed cause the system to:
  performing an action associated with the first state, the at least one other state, or the transition.

23. The machine readable medium of claim 22 wherein:
the action can be constrained by at least one of: a policy and a role.

24. The machine readable medium of claim 22 wherein:
the action can include one of: a function/machine readable medium call, a remote procedure call, inter-process communication, intra-process communication, interfacing with a hardware device, checking the content into/out of version control, processing the content, providing a notification to a user.

25. The machine readable medium of claim 19 wherein:
a state change can be initiated by a user or a process.

26. The machine readable medium of claim 19, further comprising instructions that when executed cause the system to:
  maintain a version history to track changes to the schema.

27. The machine readable medium of claim 19, further comprising instructions that when executed cause the system to:
  implement a service provider interface (SPI) that is compatible with the VCR.

* * * * *

UNITED STATES PATENT AND TRADEMARK OFFICE
CERTIFICATE OF CORRECTION

PATENT NO. : 7,580,953 B2  Page 1 of 1
APPLICATION NO. : 11/098781
DATED : August 25, 2009
INVENTOR(S) : Rodney McCauley et al.

It is certified that error appears in the above-identified patent and that said Letters Patent is hereby corrected as shown below:

Title Page, Item (56) on page 4, in column 2, under "Other Publications", line 20, after "for" insert -- an --.

In column 1, line 17, below "Apr. 13, 2004." insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In column 2, line 5, delete "LIFECYLES," and insert -- LIFECYCLES, --, therefor.

In column 2, line 10-11, delete "LIFECYCYLE" and insert -- LIFECYCLE --, therefor.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO.       : 7,580,953 B2                                              Page 1 of 1
APPLICATION NO.  : 11/098781
DATED            : August 25, 2009
INVENTOR(S)      : McCauley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Fourteenth Day of September, 2010

David J. Kappos
*Director of the United States Patent and Trademark Office*